(12) United States Patent
Carbone et al.

(10) Patent No.: US 10,286,853 B1
(45) Date of Patent: May 14, 2019

(54) AUTOMATED SELF-LOADING CARGO CARRIER FOR VEHICLES

(71) Applicants: Frank Louis Carbone, Irvine, CA (US); Dominique Annalise Carbone, Irvine, CA (US)

(72) Inventors: Frank Louis Carbone, Irvine, CA (US); Dominique Annalise Carbone, Irvine, CA (US)

(*) Notice: Subject to any disclaimer, the term of this patent is extended or adjusted under 35 U.S.C. 154(b) by 0 days.

(21) Appl. No.: 15/972,070

(22) Filed: May 4, 2018

(51) Int. Cl.
*B60R 9/042* (2006.01)
*G05D 3/10* (2006.01)
*B60R 9/055* (2006.01)

(52) U.S. Cl.
CPC ............ *B60R 9/042* (2013.01); *B60R 9/055* (2013.01); *G05D 3/10* (2013.01)

(58) Field of Classification Search
CPC ............ B60R 9/042; B60R 9/055; G05D 3/10
USPC ......... 414/462–466; 224/309, 310, 314, 315, 224/316, 321, 323, 326, 327, 328, 330, 224/331; 362/487, 493, 496
See application file for complete search history.

(56) References Cited

U.S. PATENT DOCUMENTS

| | | | |
|---|---|---|---|
| 3,823,839 A | 7/1974 | Petzing | |
| D269,667 S | 7/1983 | Taylor | |
| 4,682,719 A | 7/1987 | Ernst | |
| 5,348,207 A | 9/1994 | Frank | |
| 5,423,650 A | 6/1995 | Zerbst | |
| 5,505,579 A | 4/1996 | Ray | |
| 5,667,116 A | 9/1997 | Reinhart | |
| 5,673,837 A | 10/1997 | Spratt | |
| 5,884,824 A | 3/1999 | Spring, Jr. | |
| 5,904,463 A | 5/1999 | Christensen | |
| 6,360,930 B1 | 3/2002 | Flickenger | |
| 6,681,970 B2 | 1/2004 | Byrnes | |
| 6,761,296 B2 | 7/2004 | Ford | |
| 7,011,239 B2 | 3/2006 | Williams | |
| 7,258,260 B2 | 8/2007 | Hurd | |
| 7,513,730 B2 | 4/2009 | Goyanko | |
| 7,581,917 B1 | 9/2009 | Depagter | |
| 7,654,423 B1 | 2/2010 | Christiansen | |
| 7,780,050 B2 | 8/2010 | Tucker | |

(Continued)

FOREIGN PATENT DOCUMENTS

| | | |
|---|---|---|
| KR | 20020010331 A | 2/2002 |
| KR | 101709147 B1 | 2/2017 |

(Continued)

*Primary Examiner* — Lynn E Schwenning
(74) *Attorney, Agent, or Firm* — Jafari Law Group, Inc.

(57) ABSTRACT

The invention involves a cargo carrier for vehicles that facilitates loading and unloading of items onto an enclosure; the cargo carrier may be automated and self-loading via actuators and a motorized mechanism that may be remotely controlled. The actuators may be configured to tilt the enclosure and one or more motors may be configured to deploy a deployable tray housed within the enclosure, which minimizes user loading or unloading labor. Typically, on a front end of the enclosure, one or more actuators may couple the enclosure to a front portion of a vehicle support structure. On a rear end of the enclosure, one or more rear fittings may be configured to tiltably couple the enclosure to a rear portion of the vehicle support structure. The deployable tray may include a conveyor mechanism to further facilitate loading or unloading.

20 Claims, 14 Drawing Sheets

(56) References Cited

U.S. PATENT DOCUMENTS

| | | | |
|---|---|---|---|
| 8,322,580 B1 * | 12/2012 | Hamilton | B60R 9/042 |
| | | | 224/309 |
| 8,622,266 B2 | 1/2014 | McMillan | |
| 8,640,933 B1 | 2/2014 | McCray | |
| 9,016,750 B2 | 4/2015 | Izydorek | |
| 9,463,748 B2 | 10/2016 | Presley | |
| 9,815,413 B2 | 11/2017 | Rudnicki | |
| 2004/0052622 A1 * | 3/2004 | Chisnall | B60P 3/40 |
| | | | 414/462 |
| 2004/0131456 A1 * | 7/2004 | Henderson | B60R 9/042 |
| | | | 414/462 |
| 2004/0195866 A1 | 10/2004 | Fin | |
| 2005/0045678 A1 | 3/2005 | Hurd | |
| 2006/0043130 A1 * | 3/2006 | Dabrowski | B60R 9/05 |
| | | | 224/328 |
| 2006/0045677 A1 * | 3/2006 | Garfield | A45C 13/385 |
| | | | 414/340 |
| 2006/0175368 A1 * | 8/2006 | Fallis, III | B60R 9/042 |
| | | | 224/310 |
| 2007/0090139 A1 | 4/2007 | McKenzie | |
| 2012/0263561 A1 * | 10/2012 | Li | B60R 9/0423 |
| | | | 414/462 |
| 2014/0097219 A1 | 4/2014 | Reiber | |
| 2016/0280114 A1 | 9/2016 | Baxter | |
| 2017/0341590 A1 | 11/2017 | McLauchlan | |

FOREIGN PATENT DOCUMENTS

| | | | | |
|---|---|---|---|---|
| KR | 20170056291 A | | 5/2017 | |
| KR | 101763384 B1 | | 8/2017 | |
| KR | 10-2017-0141585 | * | 12/2017 | B60R 9/045 |

\* cited by examiner

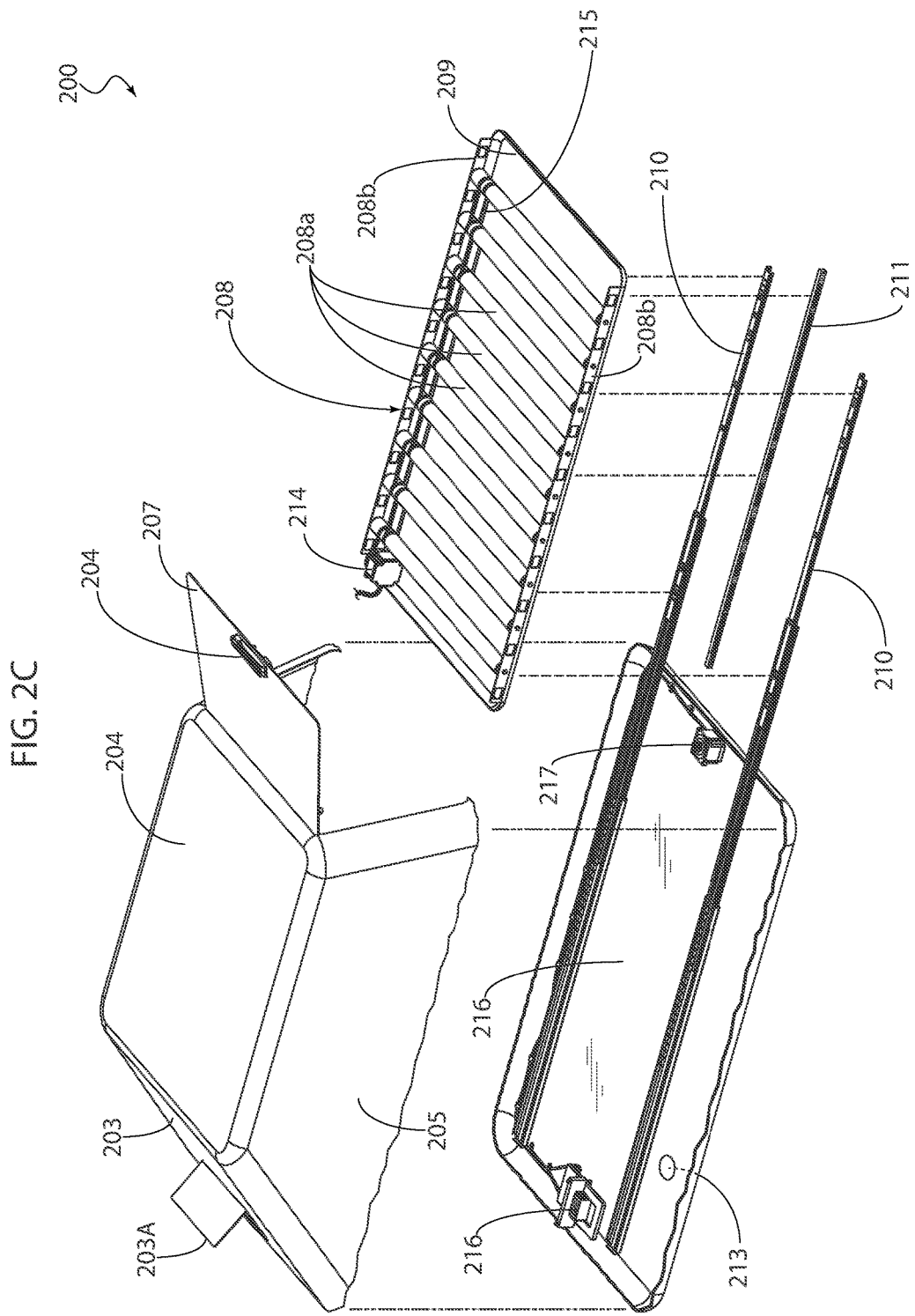

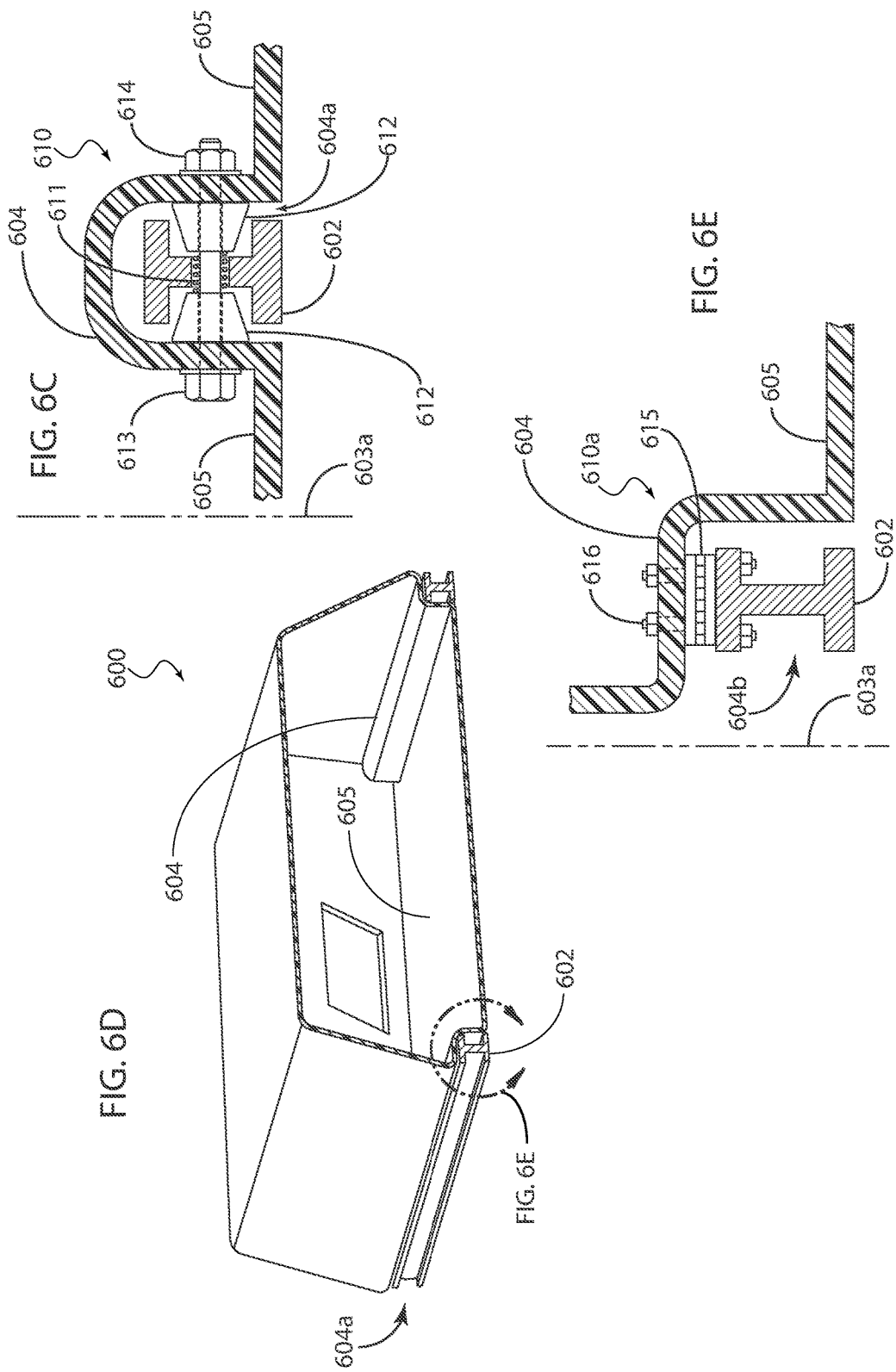

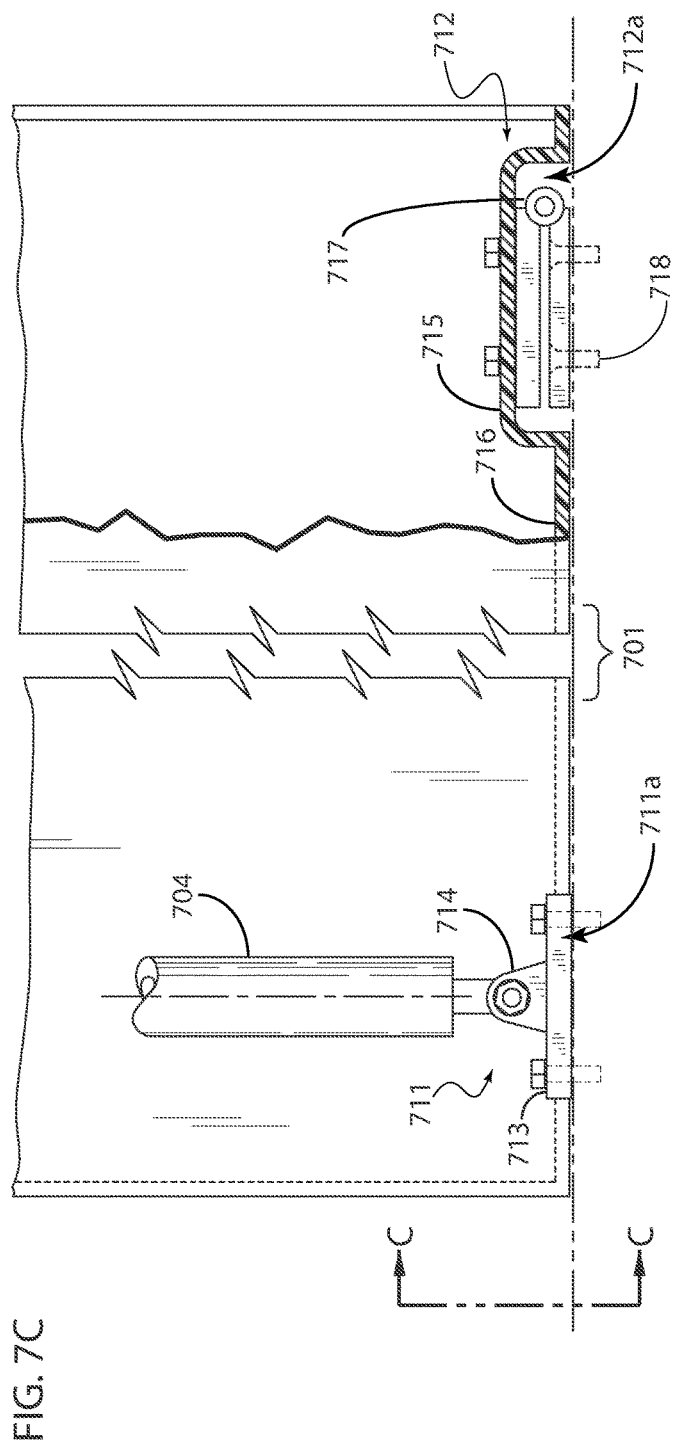

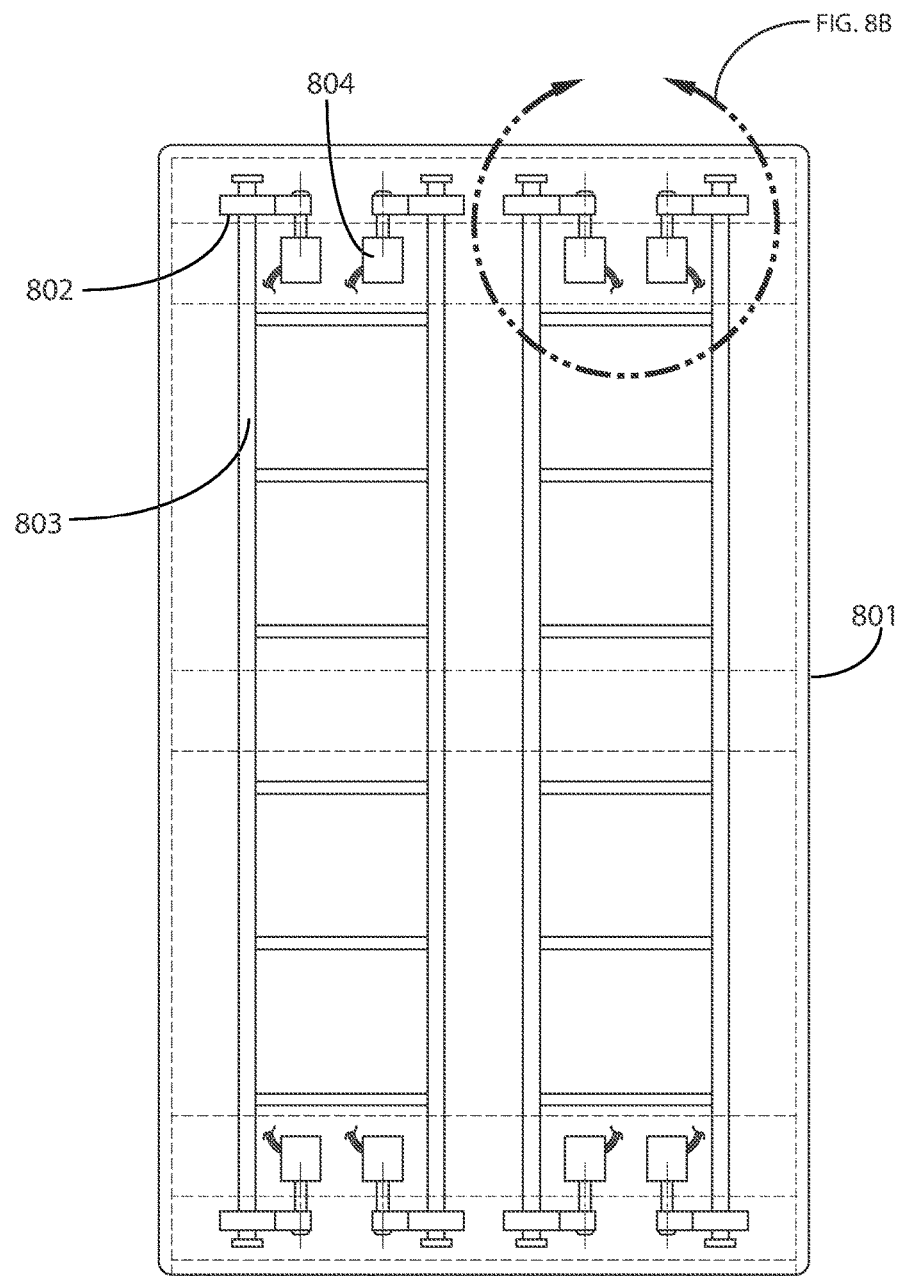

AUTOMATED SELF-LOADING CARGO CARRIER FOR VEHICLES

TECHNICAL FIELD OF THE INVENTION

The present invention relates generally to a cargo carrier for vehicles. More specifically, the present invention relates to an automated self-loading cargo carrier for vehicles that facilitates loading and unloading of items onto an enclosure, via actuators and a motorized mechanism that may be remotely controlled.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

Additional storage space for vehicles is seemingly always desirable. To these ends, numerous different storage racks, storage containers and cargo carriers have been disclosed. In fact, a variety of vehicle roof racks and storage or cargo carrying containers are currently available in the market. Moreover, the prior art is riddled with distinct types of cargo carrying means ranging from modular rack systems, to extendable racks and motorized elevators that can be attached to the rear, the roof or other parts of a vehicle. Nevertheless, despite the variety of disclosed devices, the prior art falls short of addressing several problems common to these known devices.

For example, a common obstacle is where to attach such devices (often including container or platforms for containers) on a vehicle. Sometimes these storage devices are coupled to a side of a vehicle; other times these devices are coupled to a front end or the rear end of a vehicle. Often, cargo carrying devices are coupled or affixed to the roof of a vehicle since the roof offers a wide surface area suitable for sustaining a heftier load. A persisting problem however, is that prior art devices still require a user to lift their cargo up to a platform, storage container, etc. When coupled to the roof, such required lifting may prove prohibitive to most users due to height and strength limitations; multiple users may be required for heavier loads or users may be limited in what items they may store with such devices (i.e. limited by the weight a user may be able to lift rather than the weight capacity of the device itself). While the average SUV has a roof height of 5.8" and larger vehicles may have a roof height of 6' or more, and since the device sits on top of the vehicle rack, an additional 3-4" on top of that is required to practically operate these devices without step ladders or the like. As such, many prior art devices are not used to their fullest potential due to this limitation.

One such device is taught by U.S. Pat. No. 5,348,207 to Frank. Frank describes a carrier apparatus for mounting on a roof of a vehicle. The apparatus includes a housing, magnetic mounts for connecting the housing to the vehicle and for supporting the housing in a horizontal orientation, and a drawer for sliding in and out of the housing. A pivoted connection is provided for connecting the drawer to the housing. When the drawer is retained in the horizontally oriented housing, the drawer is in the horizontal storage mode. When the drawer is pulled out from the housing and hangs down from the housing by the pivoted connection, the drawer is in the vertical access mode. Although the mounts can include a fluid suspension, lifting the cargo up into the container must be done manually, which as mentioned above significantly limits the type and weight limit of the cargo that a user will be able to load using this device.

Another device with a similar limitation is taught by U.S. Patent Publication 2017/0341590 to McLauchlan. McLauchlan describes a roof rack for a vehicle having a roof attachment means, a cargo frame adapted to releasably engage with cargo and a means to enable the cargo frame to be moved between a horizontal position above the roof of a vehicle and a vertical position behind the vehicle. In use, the roof rack is attached to the roof of a vehicle via the roof attachment means wherein a user standing behind the vehicle is able to pull the cargo frame or attached cargo towards himself such that the cargo frame and attached cargo moves from a substantially horizontal position above the roof of the vehicle to a substantially vertical position behind the vehicle so that the user can load and/or unload the cargo. Once this is done, the user can push the cargo frame or attached cargo such that the frame moves from a vertical position behind the vehicle to a horizontal position above the roof of the vehicle. Again, lifting the cargo up to the horizontal position can be difficult for most potential consumers, and as mentioned above significantly limits the type and weight limit of the cargo that a user will be able to load using this device.

Other devices address the problem of having to lift a load up to the roof by implementing a motor. One such device is taught by U.S. Patent Publication 2006/0175368 to Fallis. Fallis describes a cargo container for a vehicle including an enclosure or movable supporting member that is connected by a linkage to the vehicle. The linkage may be used to shift the enclosure between a transport position above the roof and a loading position behind the vehicle. A rearward pivoting member lifts portions of the enclosure behind the forward member upwardly to clear a rear corner of the vehicle as the enclosure is moved between the transport position and the loading position. Although this device appears to implement a motor for lifting the device between the loading position and the transport position, its use appears cumbersome and in order to facilitate the movement of the device, storage space must be substantially limited.

Limited cargo space is yet another problem that has not been adequately addressed, especially by devices that implement motorized lifting mechanisms. One such device is taught by U.S. Pat. No. 3,823,839 to Petzing. Similarly, U.S. Pat. No. 9,463,748 to Presley discloses a powered cargo rack for tall vehicles. Each of these devices fails to disclose an adequate storage space; likely due to their cumbersome lifting mechanisms that take up space otherwise suitable for cargo.

U.S. Pat. No. 5,667,116 to Reinhart forgoes the motorized feature in order to provide a more adequate cargo space, by implementing a two-part or clamshell compartment. As such, although the cargo space is increased, the implementation of clamshell compartments introduces still other setbacks.

For example, clamshells are typically long and narrow. Because of their narrow shape, most consumers install them on one side of their vehicle's roof—otherwise they are unreachable. This creates an unstable load while driving and is therefore undesirable. Moreover, these devices are designed to attach to a cross-member of an SUV's roof rack. For cars that only have longitudinal rails, like most of the newer roof racks, clamshell manufacturers sell their own cross-members and fittings to attach to the factory-installed longitudinal rails.

Newer model clamshells open and lock from either of their longitudinal sides, but the hinging and locking mechanisms, and the cargo containers themselves, are flimsy; consequently, the hinges and locks are prone to breaking, which is a common complaint amongst current clamshell owners. Current devices available on the market are also of limited volume, typically occupying less than 50% of the vehicle roof's area, provoking some users to mount two devices side by side in order to accommodate all of their luggage and equipment. But the most limiting factor of such existing devices is that they are very difficult to load and access, typically requiring a step ladder or other specialized ladders (e.g. one that fits over the rear tire) in order to reach the device once it is mounted on top of the vehicle.

Therefore, there exists a previously unappreciated need, and an inadequately addressed problem, requiring a new and improved cargo carrier for vehicles. There is a need for a cargo carrier that addresses the problems mentioned above; enables motorized and automated loading of cargo onto a containment shell or enclosure; employs an enclosure of a durable construction that maximizes a surface area for storage; and is easily utilized by a wide segment of consumers for a wide range of uses. It is to these ends that the present invention has been developed.

SUMMARY OF THE INVENTION

To minimize the limitations in the prior art, and to minimize other limitations that will be apparent upon reading and understanding the present specification, the present invention describes an automated self-loading cargo carrier for automobiles that facilitates storing a variety of items.

Generally, the invention involves a cargo carrier for vehicles that facilitates loading and unloading of items onto an enclosure; the cargo carrier may be automated and self-loading via actuators and a motorized mechanism that may be remotely controlled. The actuators may be configured to tilt the enclosure and one or more motors may be configured to deploy a deployable tray housed within the enclosure, which minimizes user loading or unloading labor. As will be apparent from the discussion of various exemplary embodiments, the present invention may be applicable to vehicles employing a roof rack as well as vans, and pick-up trucks.

Typically, on a front end of the enclosure, one or more actuators may couple the enclosure to a front portion of a vehicle support structure. On a rear end of the enclosure, one or more rear fittings may be configured to couple the enclosure to a rear portion of the vehicle support structure. In some exemplary embodiments, the support structure is a vehicle roof rack. In some exemplary embodiments, the support structure may include a bed of a truck or the interior surface of a van.

Typically, the enclosure incudes a front wall, side walls, a top surface, a bottom surface and a rear access door opposite to the front wall of the enclosure. Inside the enclosure, a deployable tray may be slidably housed therein, coupled to one or more motors that may be employed to deploy or slide the deployable tray outside of the enclosure during a loading or unloading sequence. To further assist a user during a loading or unloading sequence, the deployable tray may further include a conveyor mechanism.

In exemplary embodiments, a controller may be configured to communicate with a remote control so that a user may control the movement of the enclosure and the deployable tray remotely.

A cargo carrier in accordance with one exemplary embodiment of the present invention, comprises: an enclosure including rear fittings configured to tiltably couple the enclosure to a rear portion of a vehicle roof rack; a pair of actuators housed inside the enclosure, each of the pair of actuators including an extension arm adapted to couple to a front portion of the vehicle roof rack; a deployable tray, slidably housed within the enclosure; one or more motors coupled to the deployable tray; and a controller in communication with the pair of actuators and the one or more motors, the controller configured to: activate the pair of actuators to tilt the enclosure; and activate the one or more motors to slide the deployable tray outside of the enclosure.

A cargo carrier in accordance with another exemplary embodiment of the present invention, comprises: an enclosure defined by a front wall, side walls, a top surface, a bottom surface and a rear access door opposite to the front wall of the enclosure, the enclosure further including rear fillings configured to tiltably couple the enclosure to a rear portion of a vehicle roof rack; one or more actuators, each of the one or more actuators coupled to one of the side walls of the enclosure and including an extension arm configured to couple with a front portion of the vehicle roof rack; a deployable tray, slidably housed within the enclosure; and a controller in communication with the one or more actuators and configured to: draw power from a rechargeable battery housed within the enclosure; and activate the one or more actuators so as to raise the front wall of the enclosure in order to tilt the enclosure.

A cargo carrier in accordance with yet another exemplary embodiment of the present invention, comprises: a cargo carrier adapted to couple to a vehicle roof rack, including: an enclosure adapted to tiltably couple to an aft end of the vehicle roof rack; one or more actuators, each of the one or more actuators coupled to a side wall of the enclosure and including an extension arm, the extension arm adapted to couple to a fore end of the vehicle roof rack; a deployable tray, slidably housed within the enclosure; a first motor coupled to the deployable tray; a second motor coupled to a conveyor mechanism installed on to the deployable tray; and a controller in communication with the one or more actuators, the first motor and the second motor, wherein the controller is configured to: draw power from a rechargeable battery housed within the enclosure; activate the one or more actuators so as to raise a front wall of the enclosure in order to tilt the enclosure; and activate the first motor to deploy the deployable tray outside of the enclosure; and activate the second motor to move the conveyor mechanism installed on the deployable cover; and a remote control configured to remotely control movement of the enclosure and the deployable tray.

It is an objective of the present invention to provide an efficient vehicle cargo carrier that addresses the limitations of the prior art mentioned above.

It is another objective of the present invention to provide an efficient vehicle cargo carrier that facilitates easy loading and unloading, while maximizing cargo space.

It is yet another objective of the present invention to automate a loading and unloading sequence.

It is yet another objective of the present invention to provide a cargo carrier to be installed on a support structure of a vehicle, such as a truck bed, an interior surface or a roof rack of the vehicle.

It is yet another objective of the present invention to provide a cargo enclosure that conforms to the length and width of a vehicle.

It is yet another objective of the present invention to provide a cargo carrier enclosure that contours to structural components of a vehicle in order to maximize storage space and conform to the vehicle's design.

It is yet another objective of the present invention to provide a cargo carrier enclosure that contours about a vehicle's roof rack in order to maximize storage space and conform to the vehicle's roof.

It is yet another objective of the present invention to provide a cargo carrier with a single piece molded construction enclosure.

It is yet another objective of the present invention to provide a cargo carrier with modular components customizable for different purposes.

These advantages and features of the present invention are not meant as limiting objectives, but are described herein with specificity so as to make the present invention understandable to one of ordinary skill in the art.

BRIEF DESCRIPTION OF THE DRAWINGS

The cargo carrier as disclosed herein is further described in terms of exemplary embodiments. These exemplary embodiments are described in detail with reference to the drawings, which have not necessarily been drawn to scale in order to enhance their clarity and improve understanding of the various embodiments of the invention. Furthermore, elements that are known to be common and well understood to those in the industry are not depicted in order to provide a clear view of the various embodiments of the invention. These embodiments are non-limiting exemplary embodiments, in which like reference numerals represent similar structures throughout the several views of the drawings. The drawings that accompany the detailed description can be briefly described as follows:

FIG. 2C illustrates a perspective exploded view of a cargo carrier in accordance with an exemplary embodiment of the present invention.

FIG. 6C illustrates a cross-sectional view of a rear attachment for an enclosure in accordance with an exemplary embodiment of the present invention.

FIG. 6D illustrates a perspective cross-sectional view of a cargo carrier fitted over a vehicle rack system, in accordance with an exemplary embodiment of the present invention.

FIG. 6E illustrates a cross-sectional view of a rear attachment for an enclosure in accordance with an exemplary embodiment of the present invention.

FIG. 7A-7D illustrate a cargo carrier in accordance with an exemplary embodiment of the present invention.

FIG. 8A-8D illustrate a cargo carrier in accordance with an exemplary embodiment of the present invention.

DETAILED DESCRIPTION OF THE INVENTION

Figure 1A:
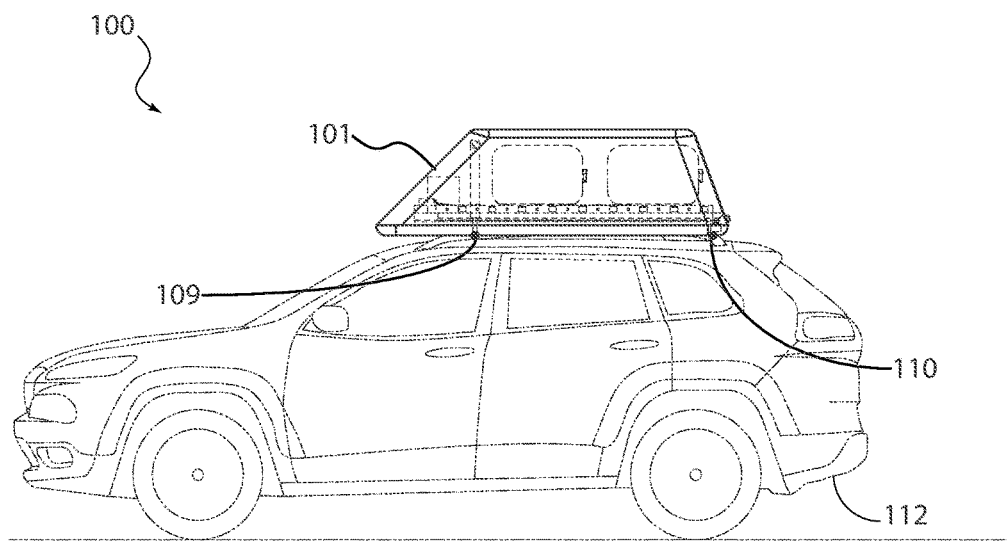
FIG. 1A-1D illustrate a side view of a cargo carrier installed on a vehicle roof in accordance with an exemplary embodiment of the present invention, the cargo carrier shown in different non-active and active positions.
Figure 1B:
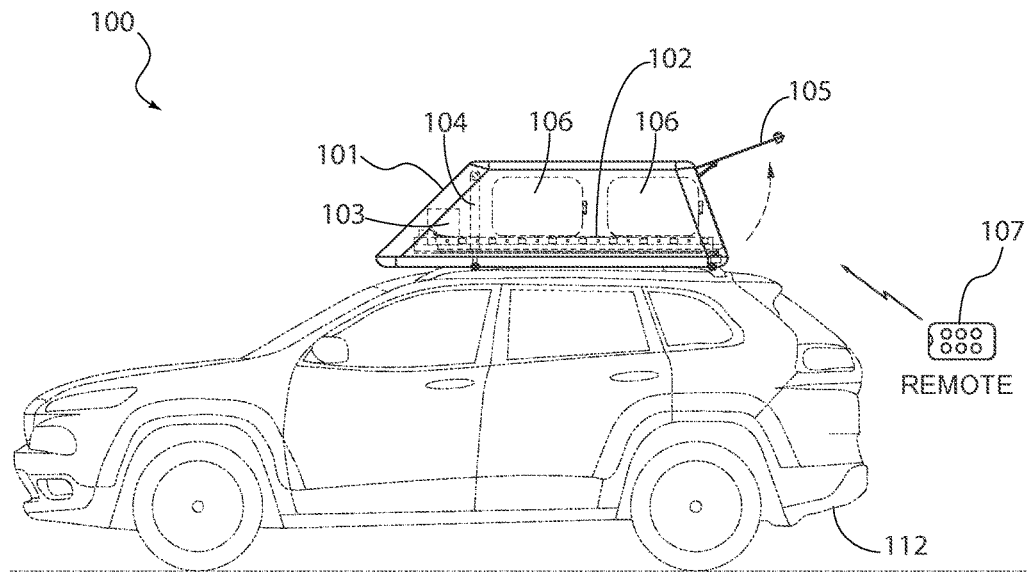
Figure 1C:
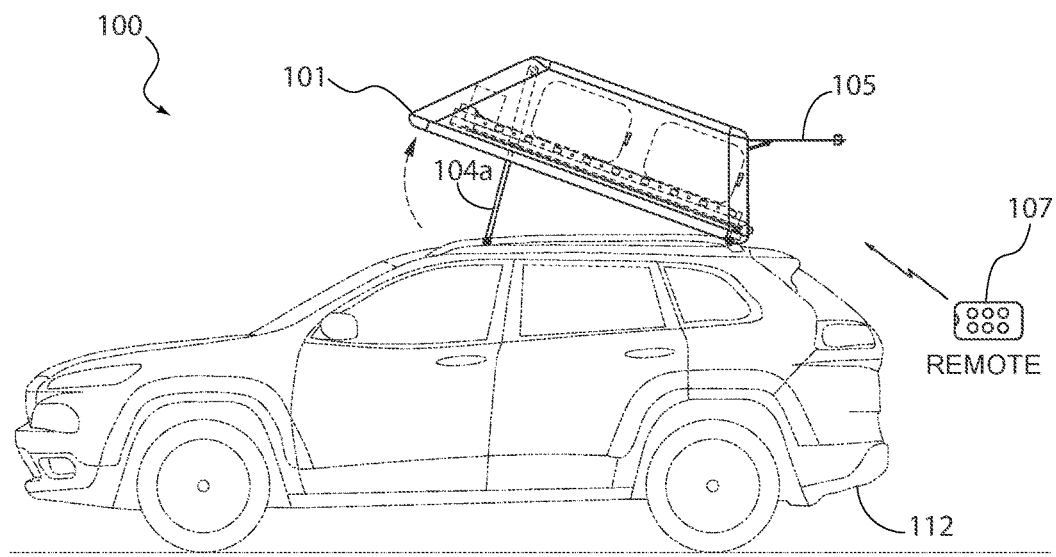
Figure 1D:
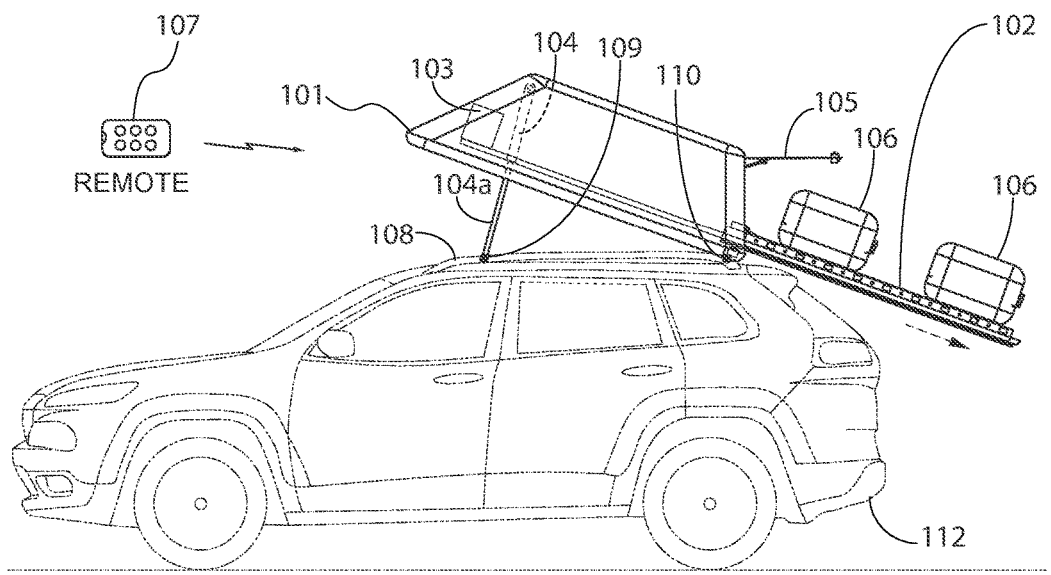
Figure 1E:
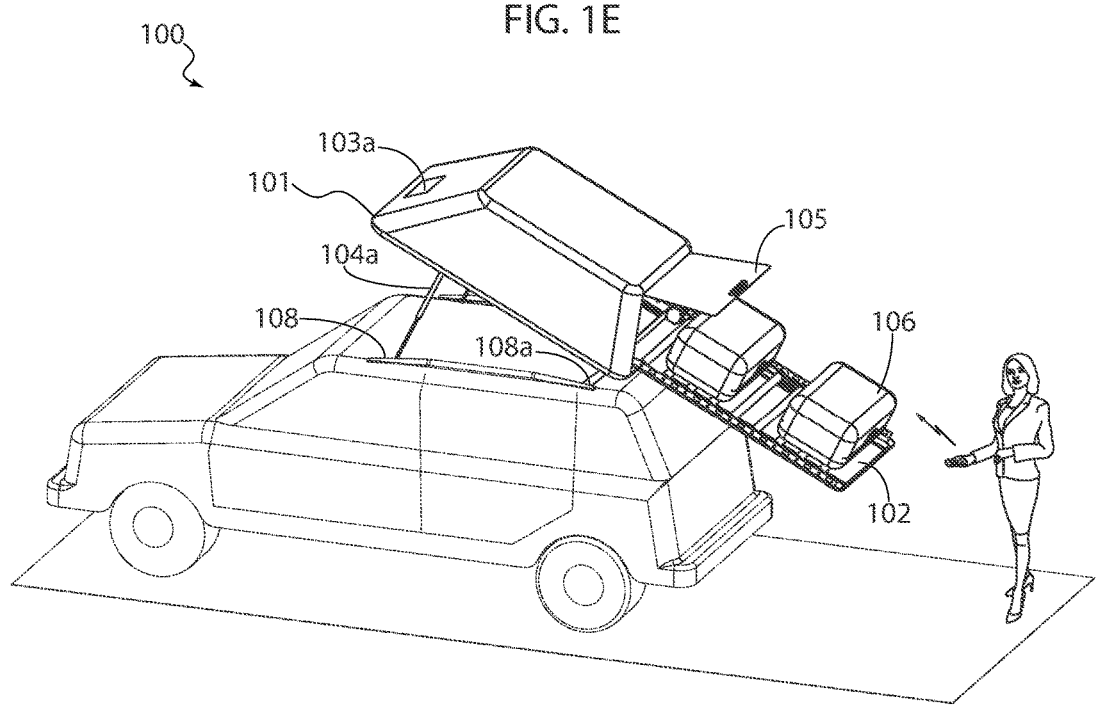
FIG. 1E illustrates a perspective view of a cargo carrier installed on a vehicle roof in accordance with an exemplary embodiment of the present invention.
Figure 1F:
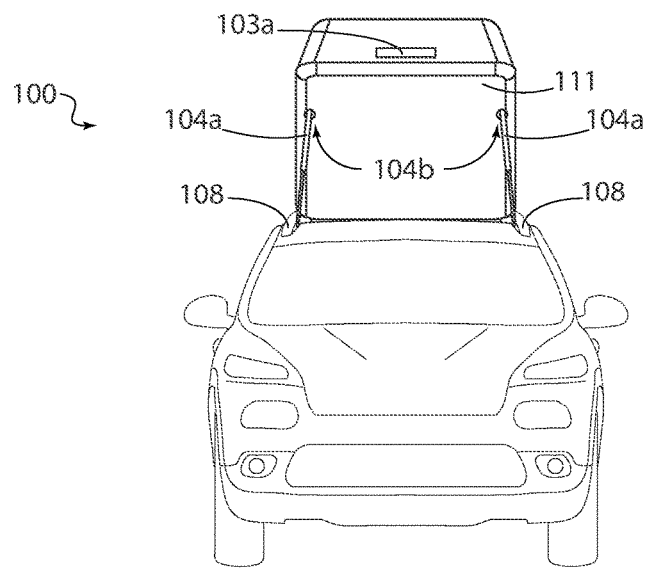
FIG. 1F illustrates a front view of a cargo carrier installed on a vehicle roof in accordance with an exemplary embodiment of the present invention.

In the following discussion that addresses a number of embodiments and applications of the present invention, reference is made to the accompanying drawings that form a part thereof, where depictions are made, by way of illustration, of specific embodiments in which the invention may be practiced. It is to be understood that other embodiments may be utilized, and changes may be made without departing from the scope of the invention. Wherever possible, the same reference numbers are used in the drawings and the following description to refer to the same or similar elements.

In the following detailed description, numerous specific details are set forth by way of examples in order to provide a thorough understanding of the relevant teachings. However, it should be apparent to those skilled in the art that the present teachings may be practiced without such details. In other instances, well known structures, components and/or functional or structural relationship thereof, etc., have been described at a relatively high-level, without detail, in order to avoid unnecessarily obscuring aspects of the present teachings.

Throughout the specification and claims, terms may have nuanced meanings suggested or implied in context beyond an explicitly slated meaning. Likewise, the phrase "in one embodiment/example" as used herein does not necessarily refer to the same embodiment and the phrase "in another embodiment/example" as used herein does not necessarily refer to a different embodiment. It is intended, for example, that claimed subject matter include combinations of example embodiments in whole or in part.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and or steps. Thus, such conditional language is not generally intended to imply that features, elements and or steps are in any way required for one or more embodiments, whether these features, elements and or steps are included or are to be performed in any particular embodiment.

The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present. The term "and or" means that "and" applies to some embodiments and "or" applies to some embodiments. Thus, A, B, and or C can be replaced with A, B, and C written in one sentence and A, B, or C written in another sentence. A, B, and or C means that some embodiments can include A and B, some embodiments can include A and C, some embodiments can include B and C, some embodiments can only include A, some embodiments can include only B, some embodiments can include only C, and some embodiments include A, B, and C. The term "and or" is used to avoid unnecessary redundancy. Similarly, terms, such as "a, an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

While exemplary embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the invention or inventions disclosed herein. Accordingly, the following detailed description does not limit the disclosure. Instead, the proper scope of the disclosure is defined by the appended claims.

Turning now to the figures, FIG. 1A-1F illustrate a side view of a cargo carrier installed on a vehicle roof in accordance with an exemplary embodiment of the present invention, the cargo carrier shown in different non-active and active positions. More specifically, these figures depict cargo carrier 100, which includes enclosure 101 that is typically coupled to a vehicle support structure such as vehicle rack 108 of vehicle 112. Enclosure 101 may house (among other components further discussed below with reference to other figures) deployable tray 102, a power supply 103, and one or more actuators 104. Typically, enclosure 101 is defined by a front wall, side walls, a top surface, a bottom surface and a rear access door 105 opposite to the front wall.

Enclosure 101 may be constructed of a variety of materials without deviating from the scope of the present invention. In exemplary embodiments, enclosure 101 comprises high-density plastic that is rotationally molded, resulting in a completely enclosed shell. In exemplary embodiments, two access openings may be cut out of the single-piece shell to form: (i) an access opening at the forward face or face wall of enclosure 101 providing access to power supply 103 and (ii) another opening opposite to the front wall of enclosure 101 for the rear face access to the interior of the shell, wherein the rear access opening is substantially as wide as a width of enclosure 101 in order to accommodate deployable tray 102 sliding out and back inside enclosure 101 during operation of cargo carrier 100. Enclosure 101 preferably although not necessarily conforms to a vehicle's design such that the enclosure minimizes interference with structural components of the vehicle. This maximizes storage space and, in some embodiments, (i.e. wherein enclosure 101 is coupled to a vehicle rack as depicted in this set of figures) reduces wind turbulence. For example, and without limiting the scope of the present invention, when coupled to a vehicle rack as shown, rather than sit between the longitudinal rails of vehicle rack 108 of vehicle 112, and rather than sitting completely above each of the longitudinal rails, enclosure 101 may include a bottom surface that contours to each longitudinal rail. Storage space is maximized as the width of the shell may be as widened, and this design enables enclosure 101 of cargo earner 100 to rest closer to the roof of vehicle 112.

Deployable tray 102 is typically a retractable surface or tray that is slidably coupled to an interior of enclosure 101 and slides in and out of enclosure 101 to facilitate loading and unloading of items 106 stored therein. Deployable tray 102 (as will be discussed further below) may implement a conveyor mechanism that facilitates such loading and unloading sequence. Deployable tray 102 may be constructed of a variety of materials without deviating from the scope of the present invention. In exemplary embodiments, deployable tray 102 is made of molded plastic (industrial versions, described below, may have aluminum litters) and may be configured to translate or slide in and out of enclosure 101 on—for example and without limitation—heavy duty ball bearing slides. As mentioned above, deployable tray 102 may be motorized and remotely controlled.

Power supply 103 may be a battery or more specifically a rechargeable battery pack, which in exemplary embodiments is installed at a front end of enclosure 101 so as to provide easy access in case of required maintenance, recharge or replacement. In exemplary embodiments, power supply 103 is configured to receive power from photovoltaic cells disposed on one or more exterior surfaces of enclosure 101. In some exemplary embodiments, the photovoltaic cells or solar panels may be, for example, disposed in a recessed surface or region of the enclosure such that the solar panels are flush with an exterior surface of the enclosure. As such, in some exemplary embodiments, power supply 103 includes a rechargeable battery pack that may be recharged with solar power from the photovoltaic cells as well as power from an external power source. In order to provide easy access to power supply 103, enclosure 101 may include an access door such as access door 103a. In some exemplary embodiments, access door 103a is cut from the front wall or front face of enclosure 101 during construction of enclosure 101. Access door 103a may be hinged at an upper edge of the smaller front opening of enclosure 101 and may include an electric lock attached to a lower edge of access door 103*a* so that access door 103*a* may be operated remotely. Moreover, in some exemplary embodiments, access door 103*a* may be configured for automatically opening and or closing. To these ends, in some exemplary embodiments, access door 103*a* may implement dual bi-directional linear actuators attached to the interior of enclosure 101. Other known features may be implemented in exemplary embodiments such as implementation of a sealing component or a rubber grommet that may be employed between access door 103*a* and enclosure 101 to eliminate potential leakage of water into enclosure 101 during inclement weather.

Actuators 104 may be any type of actuators suitable for raising a front end of enclosure 101 of cargo carrier 100, in order to tilt enclosure 101 in the manner depicted in FIG. 1C-FIG. 1F; this position allows deployable tray 102 to be slid out or positioned at a lower height in order to allow a user to use minimal effort in loading their items onto enclosure 101. This feature is particularly useful when, as in the shown embodiment, enclosure 101 is installed on a vehicle's roof rack such as vehicle rack 108; while a user typically would require greater effort to raise an item up to the height of the roof of vehicle 112, tilting enclosure 101 and sliding or lowering deployable tray 102 merely requires the user to lift the desired item up to a much more manageable height. In exemplary embodiments, as will be discussed in more detail below, actuators 104 are configured to tilt enclosure 101 such that deployable tray 102 may be lowered to a height suitable for users, such as for example and without limiting the scope of the present invention, a user's waist-height, knee-height, thigh-height or any suitable height that makes loading and unloading manageable to users; in an exemplary embodiment, deployable tray 102 may be lowered to a height of approximately 24 inches. In exemplary embodiments, actuators 104 are housed within enclosure 101; however, in other exemplary embodiments, actuators 104 may be coupled to an exterior of enclosure 101 without deviating or limiting the scope of the present invention. Of course, housing actuators 104 within enclosure 101 maximizes enclosure 101's conformity to the design of vehicle 112, while implementation of actuators 104 on an exterior of enclosure 101 may maximize a storage space within enclosure 101. In some exemplary embodiments, a single actuator may be utilized. In some exemplary embodiments, a pair of actuators may be employed. In some exemplary embodiments, more than one actuator is employed without limiting the scope of the present invention.

Actuators 104 may comprise of any type of actuators suitable for tilting a position of enclosure 101. In some exemplary embodiments, actuators 104 comprise of linear actuators that are electrically powered actuators (one on each side of enclosure 101). As will be mentioned in more detail below, each actuator may be coupled to vehicle rack 108 at a front portion 109 of the longitudinal rails of rack 108; when actuators 104 are activated, the front portion of enclosure 101 is raised while one or more aft attach fittings 110 coupling enclosure 101 to a rear portion of rack 108 enable enclosure 101 to rotate about an axis through the two aft attach fittings 110. This may be achieved by coupling aft attach fittings 110 to a portion of longitudinal rails of rack 108 such as horizontal rail 108*a* via hinges. Accordingly, actuators 104 typically include extension arms 104*a* that may traverse through a portion of enclosure 101 such as openings 104*b* situated at a bottom surface 111 of enclosure 101 in order to extend a length of each actuator 104 below the bottom surface 111 of enclosure 101 thereby raising the front end of enclosure 101 as described and exemplarily shown in the figures.

Access door 105 may be constructed of the same material as enclosure 101 or may be constructed of a different material altogether without limiting the scope of the present invention. In some exemplary embodiments, access door 105 is cut from the rear face of enclosure 101 during construction of enclosure 101. Access door 105 may be hinged at an upper edge of the rear opening of enclosure 101 and configured for automatically opening and or closing. In some exemplary embodiments, access door 105 may implement dual bi-directional linear actuators attached to the sides and interior of enclosure 101. Access door 105 may include an electric lock attached to a lower edge of access door 105 that can be operated remotely. Other known features may be implemented in exemplary embodiments such as implementation of a sealing component or a rubber grommet that may be employed between access door 105 and enclosure 101 to eliminate potential leakage of water into enclosure 101 during inclement weather.

Items 106 may of course comprise any storable items, including but not limited to typical travel items such as suitcases (as shown), boxes, sports equipment, or other items a user may choose to travel with including but not limited to occupational tools, other equipment, etc. As will be discussed with reference to other figures below, depending on the type or structure of storable items 106, enclosure 101 and or deployable tray 102 may employ components to facilitate the secured storage of such items; the components may include a molded tray suitable for storing tools and equipment having known universal shapes, or clamps for securing items such as skis so that the skis stay secured to a side wall or interior surface of enclosure 101.

In order to control activation of actuators 104 and any motor or set of motors that may be employed by deployable tray 102, a control circuitry may be configured to communicate with each device and may further be configured to communicate with a remote-control device, such as remote control 107 so that a user may control activation of each component remotely. Remote control 107 may facilitate a user to: remotely activate the movement (including the tilting and leveling) of enclosure 101 by activation of actuators 104; remotely activate the movement (including the sliding out and sliding in) of deployable tray 102 by activation of one or more motors coupled to deployable tray 102; and or remotely activate a locking and or opening and closing of access doors such as access doors 103*a* and 105.

Cargo carrier 100 is attached at four points to the longitudinal rails of rack 108 of vehicle 112: left, right, fore and aft, wherein the two forward attachment points 109 connect actuators 104 (one on each side of enclosure 101) to the forward mounting points on the longitudinal rails of rack 108; and wherein the two aft attach fitting points 110 couple enclosure 101 to a rear portion of longitudinal rails of rack 108 (e.g. in the embodiment of FIG. 1E a horizontal rail 108*a* may be utilized instead) enable the enclosure to rotate about an axis through the two aft attach points 110 (i.e. one on each side of enclosure 101); in exemplary embodiments, aft attach fittings 110 are hinged attachment fittings. In some exemplary embodiments, linear actuators raise the enclosure to a maximum angle of approximately thirty degrees. In some exemplary embodiments, the angle is adjustable, determined by how far the linear actuators are extended. For example, and without deviating from the scope of the present disclosure, the taller the user of cargo carrier 100 and the longer the length of enclosure 101, the less angle required for the end of the deployable tray 102 that will be required to extend down to a suitable height that makes loading and unloading manageable to users of cargo carrier 100. In exemplary embodiments, the angle and or height at which deployable tray 102 may be lowered to is programmable using remote control 107; for example, and without limiting the scope of the present invention, remote 107 may be programmable with different heights and or positions for different users (e.g., husband and wife) to raise enclosure 101 and extend deployable tray 102 to each user's desired loading position.

In the embodiments depicted in FIG. 1A-FIG. 1F, it may be appreciated that cargo carrier 100 is a self-loading cargo container, which may be conveniently mounted to vehicle 112's roof rack. Cargo carrier 100 facilitates any person to single handedly load items 106 (such as luggage or any other object that they can lift to a suitable height such as waist-high) into enclosure 101, which securely sits on top of vehicle 112. Whether vehicle 112 is a small SUV, a large SUV, a pickup truck or van, regardless of the height of the vehicle's roof, cargo carrier 100 minimizes efforts for loading and unloading storable items. In contrast to prior devices, cargo carrier 100 is unique in several key aspects that enable a more rigid, spacious container that can be easily loaded without the use of ladders or help from other individuals as is commonly required with known devices. Most significantly, cargo carrier 100 loads automatically, and may be operated by one individual, regardless of stature, and can carry heavier cargo because the individual cargo pieces need only be lifted to a manageable height such as thigh high or waist high instead of to the top of the vehicle, as required with current storage devices. Moreover, in exemplary embodiments involving vehicles with larger roof surface areas, e.g. large SUVs or extended vans, the deployable tray may extend far enough to touch the ground, enabling cargo to actually be wheeled onto the tray via a ramp extension; such embodiment is discussed further below with reference to FIG. 7A and FIG. 7B.

Figure 2A:
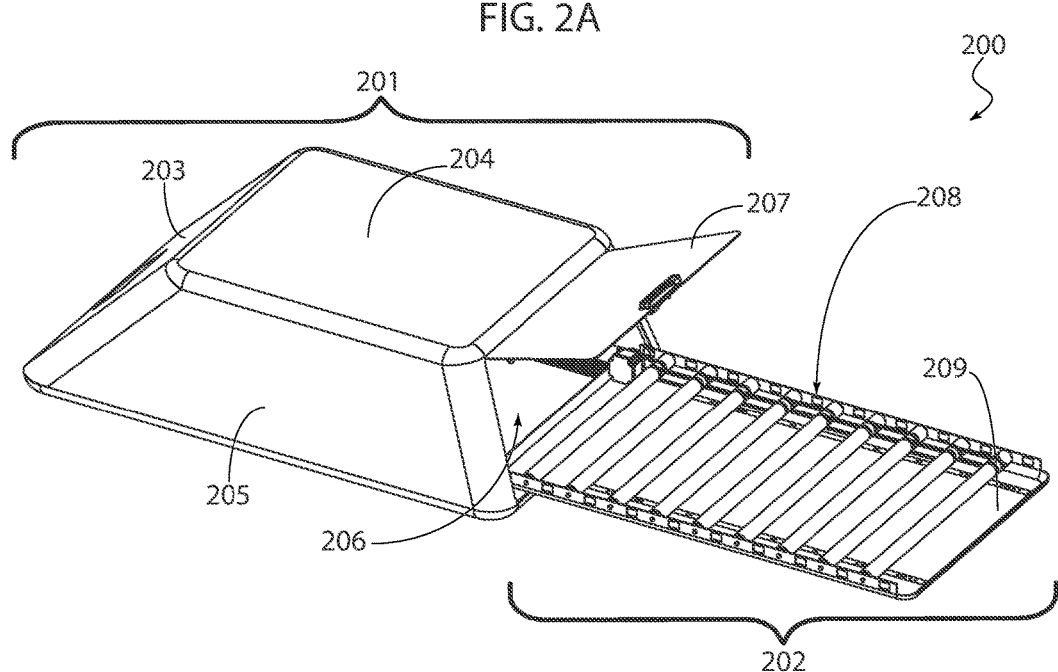
FIG. 2A illustrates a perspective top view of a cargo carrier in accordance with an exemplary embodiment of the present invention.
Figure 2B:
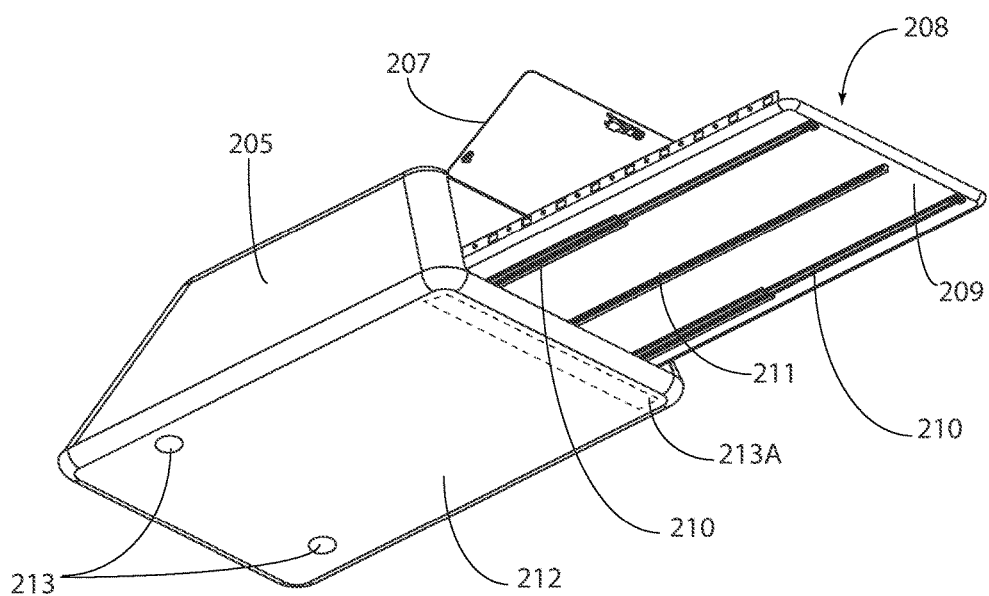
FIG. 2B illustrates a perspective bottom view of a cargo carrier in accordance with an exemplary embodiment of the present invention.

Turning now to the next set of figures, FIG. 2A illustrates a perspective top view of a cargo carrier in accordance with an exemplary embodiment of the present invention; FIG. 2B illustrates a perspective bottom view of a cargo carrier in accordance with an exemplary embodiment of the present invention; and FIG. 2C illustrates a perspective exploded view of a cargo carrier in accordance with an exemplary embodiment of the present invention. More specifically, these figures depict cargo carrier 200, comprising an enclosure 201 that secures or houses deployable tray 202 within.

From these views, enclosure 201, deployable tray 202 and other components of a device in accordance with the present invention may be better appreciated. As mentioned above, the shape of an enclosure for a cargo carrier in accordance with the present invention may be such that aerodynamics of a traveling vehicle are aided by the conforming design of the enclosure. In the current embodiment depicted in these figures, enclosure 201 includes a front wall or face wall 203 that may be slightly slanted (in some embodiments slanted about 30 degrees i.e. to minimize wind loading), a flat top surface 204, flat side walls 205 and a rear opening 206 to which access is controlled via access door 207; moreover, a rear portion of enclosure 201 is slightly slanted albeit less so than face wall 203. The edges of the enclosure may be sharp or rounded as shown without deviating from the scope of the present invention.

In exemplary embodiments, enclosure 201 is a single-piece molded enclosure made of a high-density plastic that is rotationally molded; such rigid single-piece construction facilitates additional storage on the interior and exterior of enclosure 201. Two access openings, a first access opening removably covered with access door 203A (on face wall 203) and a second access opening or rear opening 206 (to which access is controlled via access door 207) are cut out of the single-piece molded enclosure. Access opening 203A is typically a small opening that may measure approximately 12" wide×8" tall, is as mentioned above cut from front or face wall 203 of the enclosure 201, and is used to access battery pack 216, typically situated at the front of the enclosure for the reasons stated above, albeit without limiting the scope of the present invention. The second access opening or rear opening 206 is typically a larger opening that may measure approximately 36" wide and 14" tall, is cut from the rear face or rear wall of the enclosure 201 and is large enough to allow deployable tray 201 loaded with storable items such as luggage (lying flat) to pass through. Other openings at a bottom surface 212 of enclosure 201 may be implemented for traversing actuator extension arms therethrough; that is, in exemplary embodiments wherein actuators are housed within enclosure 201, openings 213 may be implemented so as to allow extension arms of each actuator to extend from these openings 213. As may be appreciated from the view of FIG. 2B, the openings would align with the rails of a vehicle roof rack such that the roof rack's longitudinal rails are below enclosure 201, which as mentioned above maximizes the storage space of cargo carrier 200. Similarly, aft or rear hinged attachment fittings 213A may be positioned and coupled along a rear section of the enclosure to tiltably couple the enclosure to a rear portion of a vehicle roof rack, in a manner so as to enable the enclosure 201 to rotate about an axis between the two rear hinged attachment fittings 213A (i.e. one on each side of enclosure 201 along the marked region in FIG. 2B).

In exemplary embodiments, enclosure 201 occupies an entire area of the roof of the vehicle, which means that enclosure 201 provides more than twice the volume of most known cargo shells installed on vehicle roof racks. In exemplary embodiments, enclosure 201 is conformal to the extent that the front and rear faces of the container are approximately tangent and contiguous with the planes of the windshield and hatchback, respectively (van containers' rear faces will be perpendicular to the roof plane since the rear panels or doors of vans are also perpendicular to the roof plane). As such, in some exemplary embodiments, the rear portion of enclosure 201 is slightly slanted although less so than front face 203.

In some exemplary embodiments, deployable tray 202 is made of molded plastic, aluminum or any other materials with a suitable strength to support storable items, depending on the requirements of deployable tray 202. Moreover, deployable tray 202 may be motorized as mentioned above. Whether or not a conveyor mechanism 208 is implemented, in exemplary embodiments, deployable tray 202 may be slid out and back into enclosure 201 with the aid of a plurality of tracks and a motor to control movement of the deployable tray 202. For example, and as in the shown embodiments of FIG. 2A-FIG. 2C, deployable tray 202 may include a flat surface 209 on which items may be placed to be loaded onto enclosure 201. A bottom portion of surface 209 may include tracks 210 for keeping a slidable movement of the deployable tray 202 running smoothly. Moreover, in some exemplary embodiments, a middle component 211 (such as a rack and pinion or ball screw component) may be implemented in a manner such that component 211 couples with motor 217, for controlling movement of deployable tray 202.

Movement of deployable tray 202, and more specifically tray surface 209, may be accomplished by a first motor 217. In exemplary embodiments, motor 217 is a pancake-type stepper motor (although other DC motor types may be employed without deviating from the scope of the present invention) attached to the aft end of the inside bottom surface 212 of enclosure 201. Motor 217 may implement a pinion gear attached to it that is meshed with track 211 that is mounted to the underside of tray surface 209, oriented longitudinally along the centerline of deployable tray 202.

Deployable tray 202 may implement low side rails 208b (i.e. in exemplary embodiments, approximately 2" high) that are horizontally slotted periodically (approximately 18-24" apart) along the sides of tray surface 209 to accommodate cargo straps to secure the load. As an option, recoiling cargo straps may be attached to one of the side rails 208b of tray surface 209 of deployable tray 202, and hooked into the corresponding slots on the other side of side rails 208b. Of course, other means of mechanizing deployable tray 202 may be achieved without deviating from the scope of the present invention. For example, and without limiting the scope of the invention, deployable tray 202 may employ a ball screw and ball nut mechanism, similar to the way tables on machine tools are moved; such solution may be more rigid and quieter than the rack and pinion option, but also more expensive.

In some exemplary embodiments, as shown, a conveyor mechanism 208 is implemented. For example, and without limiting the scope of the present invention, a motorized conveyor includes a snap-in or bolt-in option that installs inside tray surface 209. The conveyor mechanism may be powered by a second motor, also mounted to the inside bottom of tray surface 209 (at the forward end of tray surface 209). The conveyor's rollers may be belt-driven, coupled to the second motor. This option allows for easier loading by "feeding" pieces of storable items such as luggage, etc. forward from the aft end of the tray surface 209, which in practice will be situated at the lowest point with reference to the ground when enclosure 201 is in an inclined or tilted position. An alternate method for powering the conveyor is to have one or more of the rollers motorized, a slightly more elegant but significantly more expensive solution. In the shown embodiment, conveyor mechanism 208 exemplarily comprises a plurality of rotatable tubes or rollers 208a that lay perpendicular to a length of deployable tray 202 across tray surface 209 and coupled to side rails 208b. Movement of conveyor mechanism 208 may be accomplished via a belt 215 coupled to rollers 208a driven by a motor 214.

Although not shown in the views of FIG. 2A-FIG. 2C, the actuators shown in FIG. 1A-FIG. 1F and the controller discussed below with reference to FIG. 3, may be employed by cargo carrier 200. Accordingly, in some exemplary embodiments, cargo carrier 200 comprises: an enclosure 201 including rear hinged attachment fittings 213A configured to tiltably couple the enclosure 201 to a rear portion of a vehicle roof rack (for example rack 108); a pair of actuators (for example actuators 104) housed inside the enclosure 201, each of the pair of actuators 104 including an extension arm 104a adapted to couple to a front portion of the vehicle roof rack 108; a deployable tray 202, slidably housed within the enclosure 201; one or more motors (motor 214 and or motor 217) coupled to the deployable tray 201; and a controller (for example see controller 303 below) in communication with the pair of actuators 104 and the one or more motors 214 and or 217, the controller 303 configured to: activate the pair of actuators 104 to tilt the enclosure 201; and activate the one or more motors to slide the deployable tray 202 outside of the enclosure 201.

Similarly, in other exemplary embodiments, cargo carrier 200 comprises: an enclosure 201 defined by a front wall 203, side walls 205, a top surface 204, a bottom surface 212 and a rear access door 207 opposite to the front wall 203 of the enclosure 201, the enclosure 201 further including rear hinged attachment fittings 213A configured to tiltably couple the enclosure 201 to a rear portion of a vehicle roof rack 108; one or more actuators 104, each of the one or more actuators coupled to one of the side walls 205 of the enclosure 201 and including an extension arm 104a configured to couple with a front portion of the vehicle roof rack 108; a deployable tray 202, slidably housed within the enclosure 201; and a controller 303 in communication with the one or more actuators 104 and configured to: draw power from a rechargeable battery 216 housed within the enclosure 201; and activate the one or more actuators 104 so as to raise the front wall 203 of the enclosure 201 in order to tilt the enclosure 201.

Figure 3:
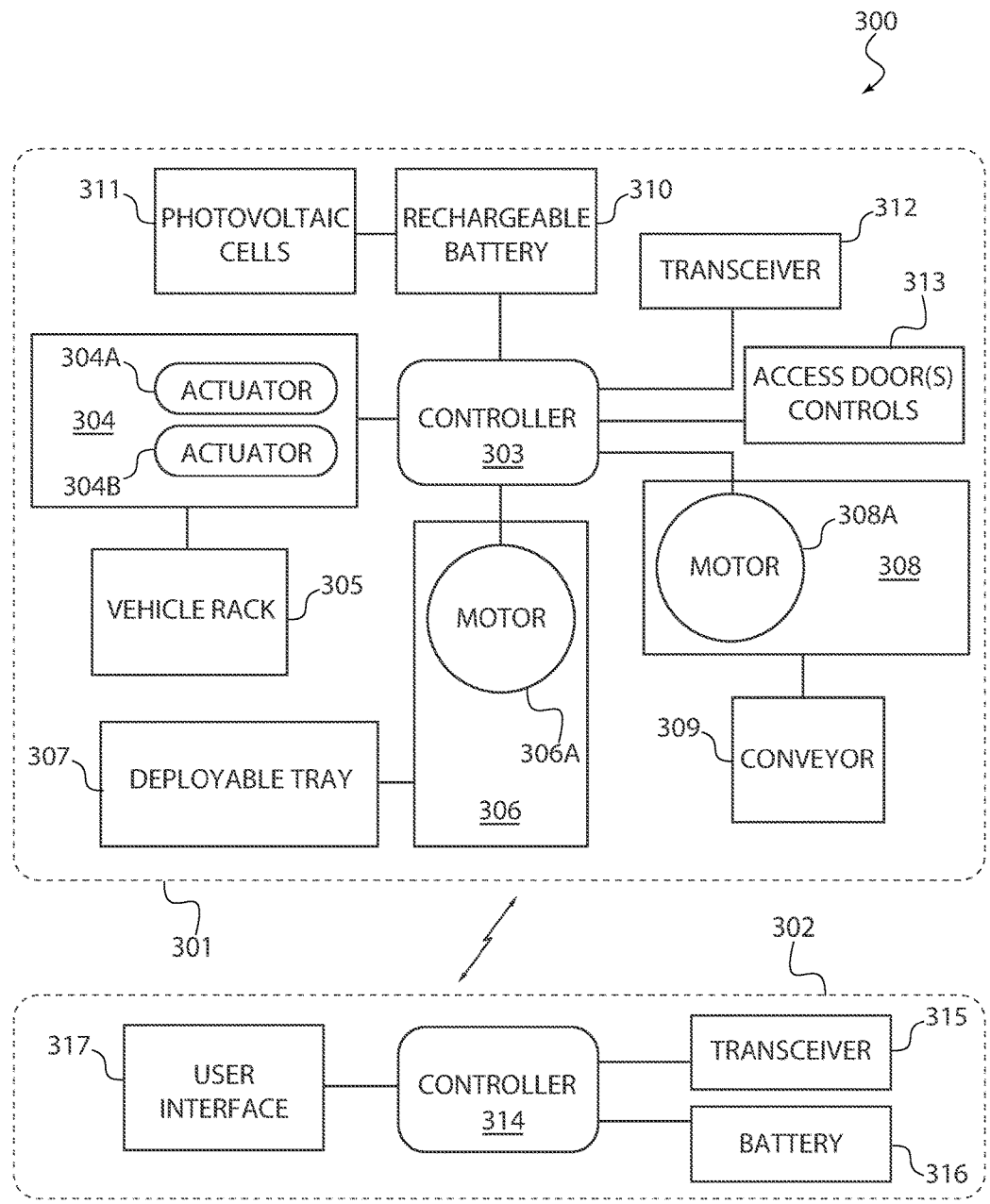
FIG. 3 illustrates a block diagram of various components for a cargo carrier system in accordance with an exemplary embodiment of the present invention.

Turning now to the next figure, FIG. 3 illustrates a block diagram of various components for a cargo carrier system in accordance with an exemplary embodiment of the present invention. More specifically, FIG. 3 depicts system 300, which includes cargo carrier 301 and a remote control 302 configured to remotely control movement of the various components of system 300.

Components of cargo carrier 301 include controller 303, which may be any type of controller suitable for communicating with the various actuators and or motors employed by cargo carrier 301. In exemplary embodiments, controller 303 is a multi-phase controller configured to: activate lifting actuator module 304 (which may comprise one or more actuators such as actuators 304A and 304B coupled to vehicle rack 305); activate sliding tray module 306 (which may comprise a motor 306A coupled to deployable tray 307); and activate rolling conveyor module 308 (which may comprise a motor 308A coupled to conveyor 309).

Controller 303 may draw power from a rechargeable battery 310, which may be in turn supplied by power from a solar energy via photovoltaic cells 311. As mentioned above, photovoltaic cells 311 may be disposed on a surface of an enclosure in accordance with the present invention.

In some exemplary embodiments, as shown in this current figure, controller 303 utilizes a receiver or transceiver 312 to communicate with remote control 302 and receive commands therefrom. In some exemplary embodiments, independent rocker-type switches may be employed to hold down in one direction or the other to activate: lifting actuator module 304, sliding tray module 306 and or rolling conveyor module 308. Controller 303 may further communicate with an access door control module 313 including additional open/close actuators and or lock/unlock switches configured to operate access doors of the enclosure. The controller may also be programmable, in the sense that it will have the ability to store multiple pre-set lift angles and shelf extensions to accommodate the various waist heights of different users.

This may be optionally achieved, without limiting the scope of the present invention, via remote control 302. In some exemplary embodiments, remote control 302 includes a controller 314, which may communicate with controller 303 via a transmitter or transceiver 315 using any known technologies including but not limited to a Bluetooth protocol or any other wireless communication protocols known in the art. Remote control 302 typically includes battery 316 as a source of power for controller 314, and a user interface 317. User interface 317 may vary in complexity without deviating from, or limiting the scope of, the present invention. For example, user interface 317 may include a screen display or may be as simple as a few pre-programmed buttons.

Accordingly, in an exemplary embodiment, cargo carrier system 300 comprises a cargo carrier 301 adapted to couple to a vehicle rack 305 of a vehicle, including: an enclosure adapted to tiltably couple to an aft end of the vehicle rack 305; an actuator module 304 including one or more actuators 304A, 304B, each of the one or more actuators coupled to a side wall of the enclosure and including an extension arm, the extension arm adapted to couple to a fore end of the vehicle rack 305; a deployable tray 307, slidably housed within the enclosure; a first motor module 306 including a first motor 306A coupled to the deployable tray 307; a second motor module 308 including a second motor 308A coupled to a conveyor mechanism 309 installed onto the deployable tray 307; and a controller 303 in communication with the one or more actuators 304A, 304B, the first motor 306A and the second motor 308A, wherein the controller 303 is configured to: draw power from a rechargeable battery 310 housed within the enclosure; activate the one or more actuators 304A, 304B so as to raise a front wall of the enclosure in order to tilt the enclosure; and activate the first motor 306A to deploy the deployable tray 307 outside of the enclosure; and activate the second motor 308A to move the conveyor mechanism 309 installed on the deployable tray 307. Furthermore, system 300 may include a remote control 302 configured to remotely control movement of the enclosure and the deployable tray via wireless communication with controller 303.

Figure 4A:
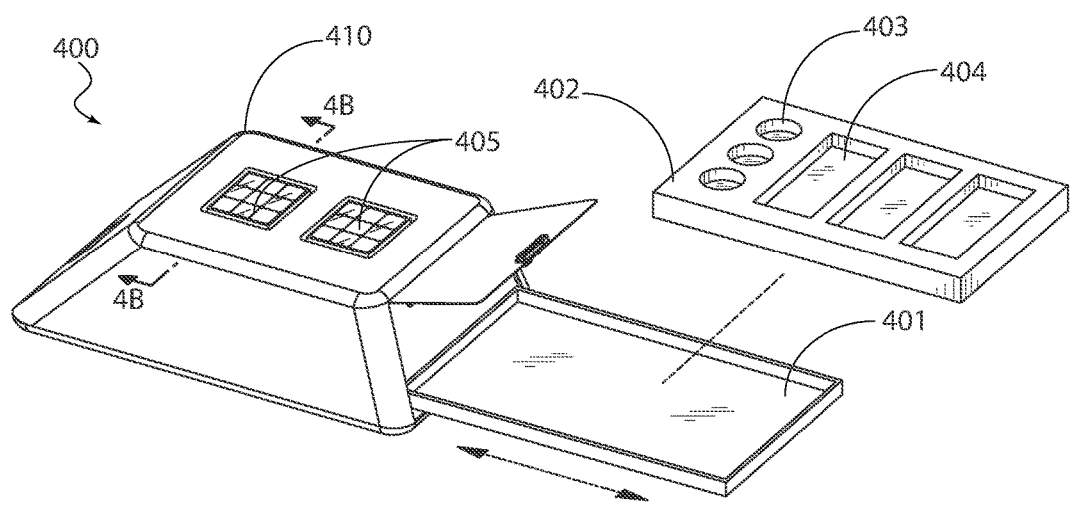
FIG. 4A-FIG. 4B illustrates a modular kit for customizing the utility of a cargo carrier in accordance with an exemplary embodiment of the present invention; in such embodiment, photovoltaic cells may be disposed on a surface of the enclosure.
Figure 4B:
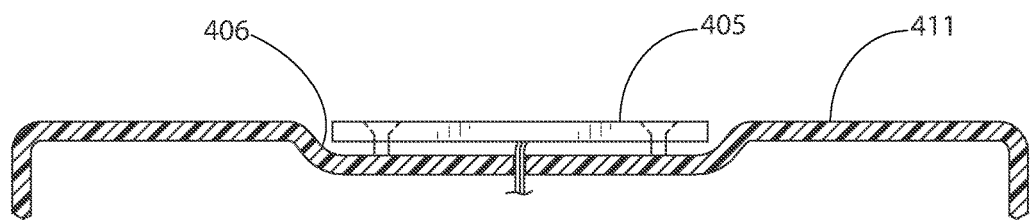

Turning now to the next set of figures, FIG. 4A illustrates a modular tray for customizing the utility of a cargo carrier in accordance with an exemplary embodiment of the present invention, and FIG. 4B illustrates a cross-sectional view thereof depicting one or more solar panels or photovoltaic cells that may be disposed on a recessed surface of an enclosure in accordance with the present invention.

More specifically, FIG. 4A depicts cargo carrier 400, which includes enclosure 410 housing a deployable tray 401. Deployable tray 401 includes a modular tray 402 that may removably couple to a surface of deployable tray 401 via for example snap-in or bolt-in "skids" that may be designed to fit inside deployable tray 401. Modular tray 402 may include protrusions, cavities, apertures, attachments or other functional elements that register with one or more commonly utilized items. For example, and without deviating from the scope of the present invention, modular tray 402 includes apertures 403 and 404. In one non-limiting example, apertures 403 may be shaped so as to fit universally accepted containers of paint—for example a typical 5-gallon container. As such, a painter or working individual may utilize modular tray 402 to carry their paints to certain jobs. Similarly, apertures 404 may be useful as tool compartments, etc.

For example, contractor modular trays may be highly customizable and re-configurable, based on the needs of each job. This may be accomplished by using latch-in or bolt-in "skids" that fit into the trays. The modular trays may take up the entire length of a deployable tray, or just a portion, to allow for multiple modular trays on a single deployable tray. Attachment features may be incorporated at regular intervals to allow maximum flexibility in configuring the deployable tray with the modular tray. For example, a painting tray may include modular trays for holding five-gallon paint buckets, made of molded plastic, like cupholders (such as apertures 403). Each modular tray for this purpose may hold two to four five-gallon buckets in a side by side configuration. Depending on the needs of the job, multiple trays may be snapped into the deployable tray.

In other embodiments, other components may be provided for such as registering components that hold spool-wire. For example, for electricians, modular trays may accommodate spools of wire that are similarly configurable to the deployable tray. Other modular trays may have multi-deep-drawer cabinets for storing large quantities of the various connectors, and or components often used in that trade.

Moreover, in the shown embodiment of carrier 400, enclosure 410 includes a plurality of photovoltaic cells exposed on an exterior surface 411 of the enclosure 410 and coupled to the rechargeable battery (not shown) of carrier 400. As depicted in FIG. 4B, some embodiments of enclosure 410 may include a recessed cross-section 406 within which one or more solar panels or photovoltaic cells 405 may be disposed in a manner so that it is flush with a top surface 411 of the enclosure 410. Naturally, such embodiment is depicted here for illustrative purposes, and it is understood that other embodiments described herein or possible per the present disclosure may also include a plurality of solar panels in the manner shown in FIG. 4A and FIG. 4B.

As such, different possibilities including implementation of solar cells and or modular trays may be offered to consumers with diverse needs. Solar panels would minimize having to recharge a battery supplying power to the components of the cargo carrier. Modular trays not only help to organize storable items but maximize a storage space within cargo carrier 400. The next exemplary embodiment achieves a similar goal but utilizing an interior frame and clamp system.

Figure 5A:
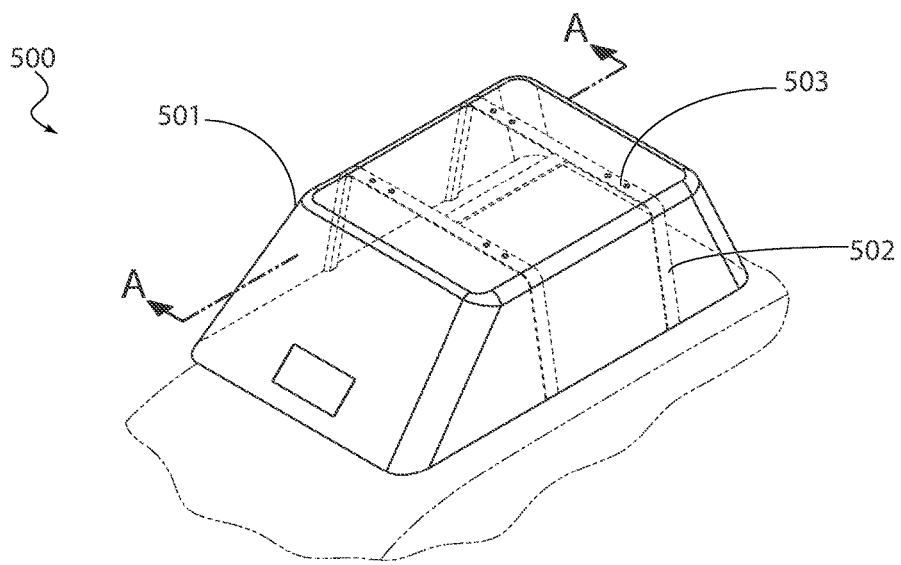
FIG. 5A-B illustrates an internal rack or frame customizing the utility of a cargo carrier in accordance with an exemplary embodiment of the present invention.
Figure 5B:
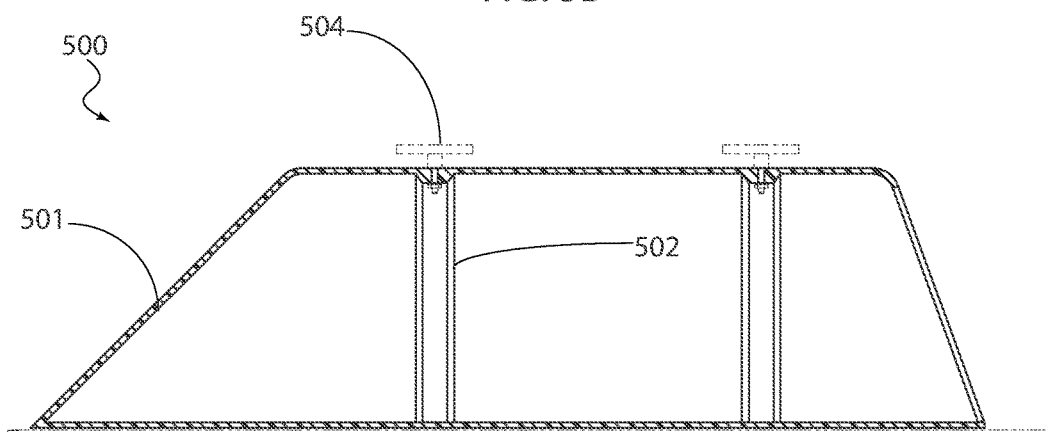

FIG. 5 illustrates an internal rack or frame customizing the utility of a cargo carrier in accordance with an exemplary embodiment of the present invention. More specifically, cargo carrier 500 is shown including enclosure 501, which comprises an internal rack or frame 502 to which attach points 503 may be incorporated in order to hold certain items such as skis, snowboards, surfboards, etc. In exemplary embodiments, frame 502 comprises an internal structure that is separate from enclosure 501, however in other exemplary embodiments, frame 502 comprises an integral frame such as support ribbing and or added wall thickness of interior portions of enclosure 501. In some exemplary embodiments, attach points 503 may be situated on the top and sides of enclosure 501 for accommodating skis, surfboards, etc. Attach points 503 may be supported by internal stiffening bands that increase the thickness of enclosure 501's material in two or more circumferential bands on the interior of the enclosure; in exemplary embodiments, the bands on the interior of the enclosure approximately double the thickness in these areas, as compared to the remaining enclosure thickness. The bands may support additions of automated "C" clamps that are configured to bolt 504 through enclosure 501 as necessary to carry equipment on the side and or top of the enclosure.

In some exemplary embodiments, such clamps may be of a modular design so that different equipment widths and depths may be accommodated. In exemplary embodiments, such clamps may automatically lock and unlock; this may be achieved with interior wiring communicating these components to a control circuitry of cargo carrier 500, in a manner understood by a person of ordinary skill in the art. These features take advantage of the fact that the enclosure is of sturdy unibody construction and opens only from the rear. Equipment, therefore, may be securely attached, loaded and unloaded from the top side surfaces of enclosure 501 without impeding the loading and unloading of interior contents.

Figure 6A:
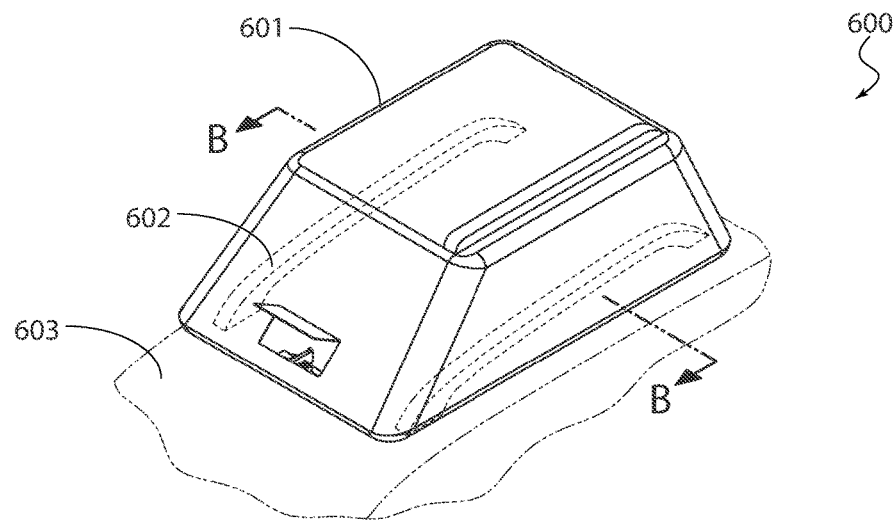
FIG. 6A illustrates a perspective cross-sectional view of a cargo carrier fitted over a vehicle rack or roof rack system, in accordance with an exemplary embodiment of the present invention.
Figure 6B:
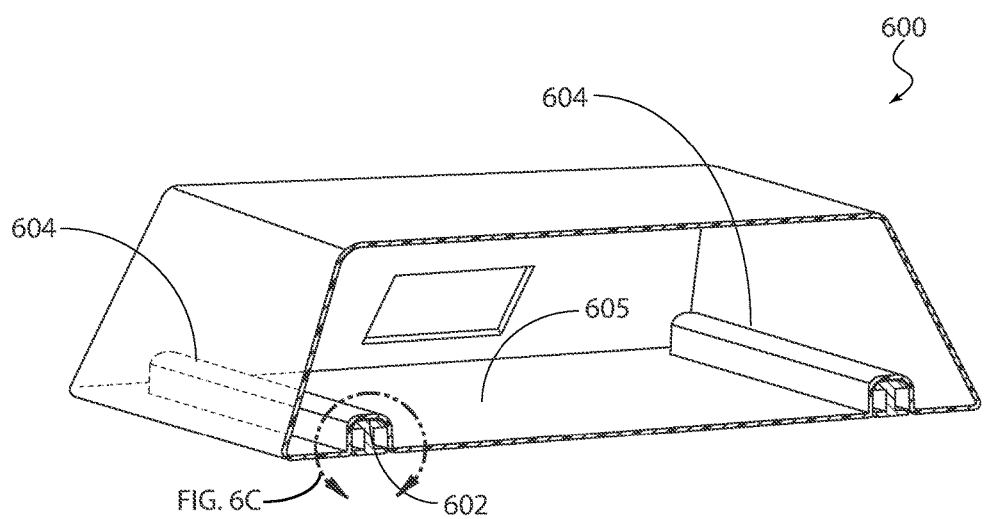
FIG. 6B illustrates a cross-sectional view of the enclosure on the cargo carrier depicted in FIG. 6A.

Turning now to the next figures, FIG. 6A illustrates a perspective view of a cargo carrier fitted over a vehicle rack system, in accordance with an exemplary embodiment of the present invention; and FIG. 6B illustrates a cross-sectional view of the enclosure on the cargo carrier depicted in FIG. 6A. More specifically, these figures depict cargo carrier 600, which comprises enclosure 601. These figures exemplify how an enclosure in accordance with the present invention may conform to a vehicle's roof as mentioned above. Vehicle 603 is shown with longitudinal rails 602 on its roof, which fit inside recessed channels 604 formed along a bottom surface 605 of enclosure 601 such that each longitudinal rail 602 of vehicle 603's roof rack sits snuggly therein. In this exemplary embodiment, recessed channels 604 each protrude or extend toward an interior of the enclosure 601.

In this manner, enclosure 601 better conforms to the vehicle's roof. These recessed channels 604 accommodate the longitudinal rails of the car's roof rack. In exemplary embodiments, recessed channels 604 sit approximately flush with the roof of the vehicle instead of 6" or more above the roof like known prior art devices; as mentioned above, this helps achieve a more integrated design while significantly reducing wind drag and turbulence. Recessed channels 604 also provide for more rigid and secured attachment, since cargo carrier 600 is attaching directly to the (typically) factory installed longitudinal rails (which are attached directly to the roof), as opposed to prior art devices that typically attach to cross-rails, which are then attached to the longitudinal rails and are therefore more prone to more vibration.

Notably, in the view of FIG. 6B, the actuators that tilt the enclosure are not shown for the sake of better depicting the characteristics of recessed channels 604. However, the following figure depicts an exemplary embodiment of rear attachment points that allow enclosure 601 to be tilted as discussed above and with reference to other embodiments. More specifically, FIG. 6C illustrates a cross-sectional view of a rear attachment point tiltably coupling the enclosure 601 to a rear portion of a vehicle roof rack or rail 602, in accordance with an exemplary embodiment of the present invention. In the view of FIG. 6C, the rear attachment points of enclosure 601 are shown (i.e. along a line opposite to line B-B such that the cross-sectional view is looking towards the rear of the enclosure 601. In this exemplary embodiment, one of the two recessed channels 604 formed along a bottom surface 605 of enclosure 601 is tiltably coupled to one of the rails such that one of the longitudinal rails 602 of vehicle 603's vehicle rack sits completely within a cavity 604a created in part by recessed channel 604 and vehicle 603's roof. To facilitate the enclosure 601 to tilt or rotably move between a leveled position and a tilted position, rear attachment point 610 may employ several components such as a spring 611, one or more conical washers 612, a shoulder bolt 613 and shoulder nut 614. In this embodiment (and as may be also appreciated from FIG. 6B), there is a short distance or space between recess 604 and a side wall of enclosure 601 connected by a portion of bottom surface 605. For illustrative purposes, line 603a depicts an exemplary proximity between enclosure 601 and a side edge of vehicle 603's roof.

Moreover, as can be appreciated from this view, in this embodiment recessed channel 604 includes a C-shape or even u-shaped construction that completely encompasses or enclosed rail 602 therein. In an alternative embodiment discussed with reference to the next figure, a differently shaped recessed channel 604 may be employed.

Turning now to the next figure, FIG. 6D illustrates a perspective cross-sectional view of a cargo carrier fitted over a vehicle rack system, in accordance with an exemplary embodiment of the present invention; FIG. 6E illustrates a close-up cross-sectional view of a rear attachment for an enclosure in accordance with an exemplary embodiment of the present invention. This embodiment may be suitable for some of the newer SUVs that employ longitudinal rails which are located close to the side edges of the vehicle, making it impractical to fully encompass them within the recessed channels 604 of the embodiment of FIG. 6C. In the embodiment of FIG. 6D, recessed channels 604 may include an alternative enclosure that has indentations or lips to accommodate the longitudinal rails, having instead of an all-encompassing cavity 604a, a cavity 604b that exposes rail 602. To these ends, recessed channel 604 includes a half c-shape or step shape that exposes the rail 602. To facilitate the enclosure 601 to tilt or rotably move between a leveled position and a tilted position, rear attachment point 610a may employ several components such as a hinge 615 and one or more bolts and washers 616. In this embodiment (and as may be also appreciated from FIG. 6E), there is a no distance or space between recessed channel 604 and a side wall of enclosure 601.

Although several embodiments have been disclosed above with reference to the figures, other embodiments may be possible without limiting the scope of the present invention. For example, although certain types of motors, components and materials are discussed above, a person of ordinary skill in the art will appreciate that different purposes may call for different types of components such as different materials stronger or more efficient motors, actuators, etc. For heavy duty loads, wherein a cargo carrier in accordance with the present invention is used for professional purposes (i.e. as opposed to recreational or everyday use), motors, actuators and all associated mechanical hardware may be heavier duty than those specified for a consumer version.

Similarly, certain designs may be implemented for other purposes. By way of a non-limiting example, a deployable tray utilized by a contractor may implement a dual, side-by-side tray or multiple horizontal tray system. In such embodiments, each tray may be operated independently, so therefore, each tray may require its own motor, rack and pinion. In such embodiments, each tray may be made out of aluminum instead of plastic, in order to support the added weight, wear and tear. Moreover, the heavier loads may require a telescoping tension tube or spooled tensioner cable to counteract the bending moment associated with a loaded tray when extended from the enclosure. In some exemplary embodiments, these tensioners may be mounted to the insides of the enclosure and the aft ends of the sides of the tray. Typically, embodiments in which multiple horizontal trays may be employed may comprise embodiments for cargo carriers coupled to trucks such as pickup trucks, given that enclosures to those carriers may have as much as twice the height as cargo carriers adapted to couple to a roof of a vehicle.

As mentioned above, although the embodiments shown in the figures largely focus on a cargo carrier that may be installed on a roof of a vehicle, other configurations may be possible. By way of a non-limiting example, in some embodiments a cargo carrier may be coupled to a pick-up truck. In such exemplary embodiments, an enclosure may rest on the front and side walls of a pickup truck bed. The enclosure may include channels to accommodate the sides of the bed, much like the above embodiments include recessed channels to accommodate the longitudinal rails of a roof rack. The front face of the shell may be optionally flat and parallel to the back of the cab of the pickup, and the aft face may be contiguous and tangent to the plane of the tailgate. The bottom of the enclosure may be parallel to the bed of the pickup and at the level of the top of the sides of the bed. In such exemplary embodiments, the enclosure may not require lifting or tilting, but may have accommodations for lifting if attached. Similarly, in other exemplary embodiments, deployable trays may slide out of the enclosure sideways rather through a rear opening.

In yet other exemplary embodiments, a double decker, or two-drawer enclosure, with a lower deck and a drawer having the geometry of the embodiment of FIG. 2, and an upper (cabover) deck's front plane contiguous and tangent to the windshield plane, and the aft face parallel and contiguous with the tailgate. In such exemplary embodiment, two rear access doors (one rear hatch per drawer) may be implemented, or one larger access door that covers both levels may be incorporated instead. In such embodiments, actuators may be employed.

In yet another embodiment, no enclosure is provided, but rather a deployable tray is provided, which may be slidably housed and or secured to an interior support structure of a vehicle. Such exemplary embodiment may include a conveyor mechanism as previously described above. In such embodiment, the deployable tray may be housed in a lightweight aluminum frame of tubular construction. For vans, the frame may attach to the vehicle using four telescoping shafts terminating in suction cups that press up against the interior sidewalls of the vehicle. For vans, the frame may bolt to the floor. Since in such embodiment, the deployable tray will be contained inside the vehicle, a controller for the deployable tray may draw power from an auxiliary power of the vehicle rather than a battery pack. Such embodiment would not require a lift or tilt system, since the deployable tray will be operating at the floor level of the back of the van or SUV (i.e. already at approximately waist height or lower).

In yet other exemplary embodiments, the cargo carriers may be "stackable", using tubular aluminum columns, approximately 2" square, which are perpendicular to the floor plane and are attached to the sides of a deployable tray frame. The columns terminate in flat pads, approximately 3" square, which are capable of being bolted to the floor of the vehicle and to a second frame that is stacked on top of it. These exemplary cargo carriers may also incorporate an option for a "false floor" that covers the device when not in use. This cover may be rigid plastic, tri or four-folded, with the folds parallel to the length of the vehicle. The covers may be designed to accurately fit the interior of specific vehicle models and would typically be used in conjunction with a "single stack" device. The cover may attach to the column pads in a similar fashion as a double stack would. These latter described embodiments may like implement a dual deployable tray system and heavier duty modular trays, actuators and motors.

Figure 7A:
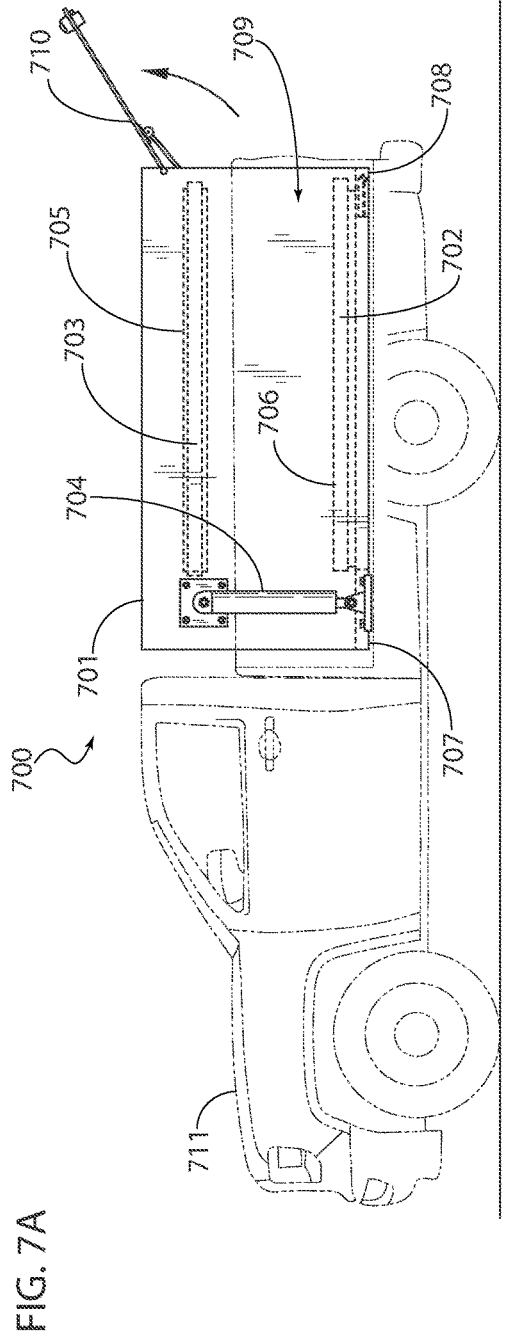
Figure 7B:
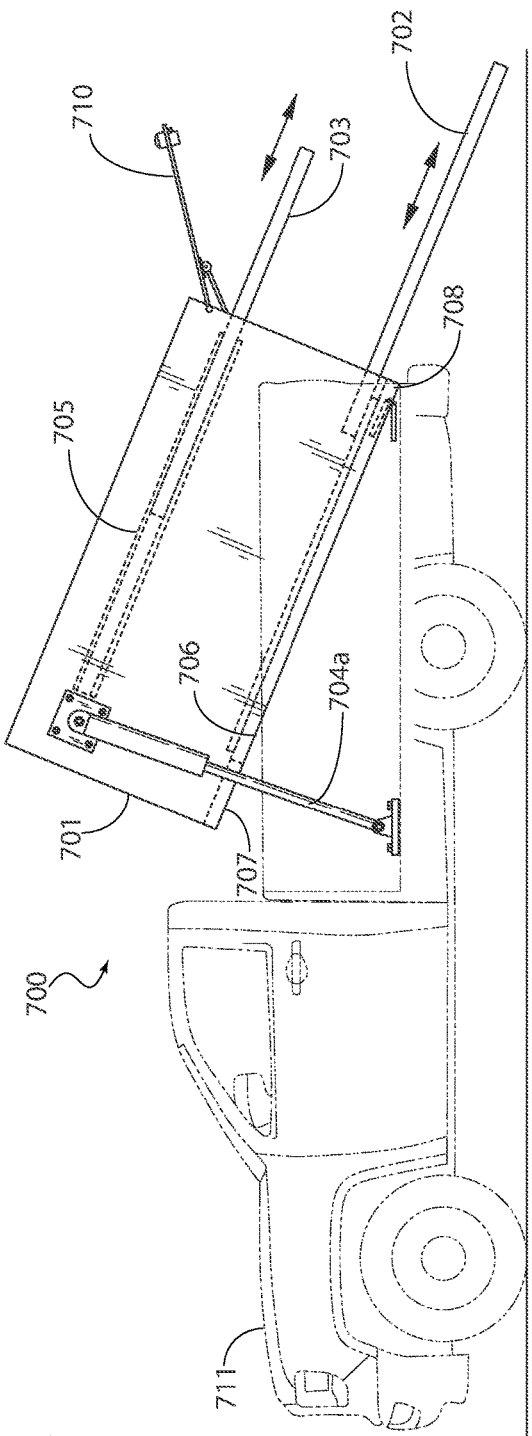

Turning now to the last set of figures, FIG. 7A-7B illustrate a cargo carrier in accordance with an exemplary embodiment of the present invention, which includes some of the elements and or configurations briefly discussed in the preceding paragraphs. More specifically, these figures depict pickup truck 711, which has been retrofitted with carrier 700.

Carrier 700 may exemplarily include enclosure 701, which is coupled to a bed of pickup truck 711 at a front end 707 via actuator arms 704a of actuators 704, and at a rear end 708, typically via hinged attachment fittings that enable enclosure 701 to pivot or tilt in a manner such that deployable tray 702 may be deployed or slid out of enclosure 701 to make contact with the ground. In exemplary embodiments, deployable tray 702 is configured to touch the ground in order to facilitate the loading of heavy equipment.

Although the principal of operation is similar to the embodiments disclosed with reference to other figures, in this exemplary embodiment, the added space of enclosure 701 further allows for implementation of multiple deployable trays. For example, and in no way limiting the scope of the present invention, deployable tray 702 may be a first deployable tray, and deployable tray 703 may be a second deployable tray suitable for added storage.

Each deployable tray 702 and 703 may use similar or different deploying systems. For example, and without limiting the scope of the present invention, deployable tray 702 may include a system similar to that of FIG. 2C in which a driving component such as a rack and pinion or ball screw component may be utilized to deploy the tray. Similarly, deployable tray 702 may ride on and be supported by a set of tracks 706. Deployable tray 703 may be deployed via actuators (not shown) that slide the tray out and back inside enclosure 701 supported or guided on tracks 705. Access to an interior of enclosure 701 may be via multiple access doors as mentioned above, or a via single access door 710 that movably secures an access opening 709 providing access to deployable trays 702 and 703. Notably, in the embodiment shown in FIG. 7A-FIG. 7B, actuators 704 are positioned outside or at an exterior of enclosure 701. However, in other embodiments, actuators 704 may be installed in an interior of enclosure 701.

Turning now to the next figures, FIG. 7C-7D illustrate exemplary front attachment point 711 and rear attachment point 712 in accordance with the present invention. In this exemplary embodiment, front attachment points 711 may include a base 713 that includes two protruding eyelets 714, which attach the lower end of the lifting actuator 704 and more specifically actuator arm 704a through an opening 711a at the front end 707 of the enclosure 701. The lower end of the actuator bolts to an attach plate that bolts to the bed of the pick-up. FIG. 7D specifically shows a front view of front attachment point 711 along line C-C. As may be appreciated from these figures, actuator 704 and front attachment points 711 are situated exterior to enclosure 701, however as mentioned above in other exemplary embodiments, these components may be housed within enclosure 701.

In this exemplary embodiment, aft or rear attachment points 712 may include a protrusion 715 on a bottom inner surface 716 of enclosure 701 that forms a cavity 712a for housing a hinge 717 that is configured to tilt enclosure 701 whenever actuators 704 are activated. In an exemplary embodiment, hinge 717 is coupled to a bed of the truck 711 via one or more bolts 718.

Figure 8B:
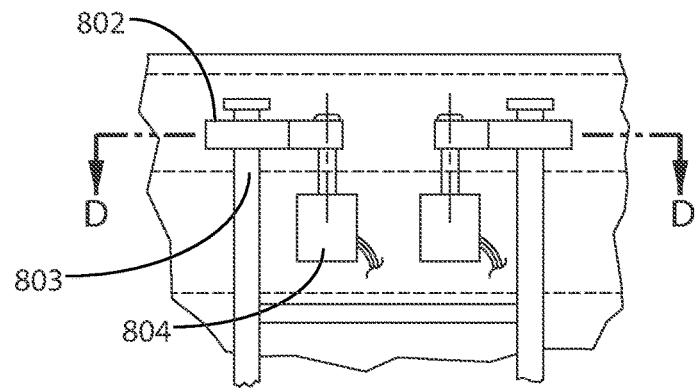
Figure 8C:
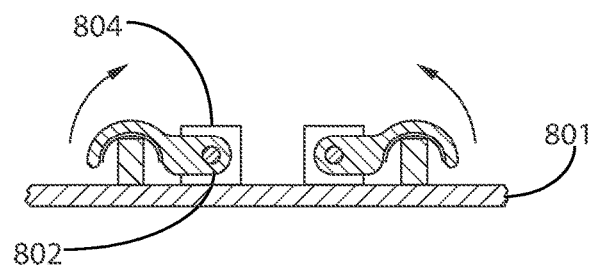
Figure 8D:
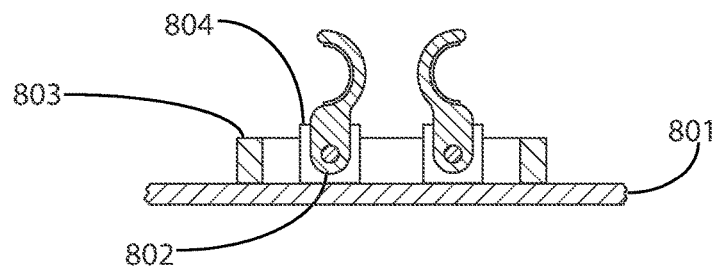

Turning now to the last set of figures, FIG. 8A-8D illustrate a cargo carrier in accordance with an exemplary embodiment of the present invention. More specifically, FIG. 8A shows a top view of enclosure 801, which includes a plurality of clamps 802 that may be remotely operated via actuators 804. In the shown embodiment, clamps 802 are used to secure a device such work ladders 803; however, clamps 802 may be configured to secure other items including but not limited to sports equipment, luggage or other cargo that may be desirable carried on a top surface of an enclosure in accordance with the present invention. FIG. 8B depicts a close-up top view thereof, and FIG. 8C and FIG. 8D show a cross-sectional view along line D-D depicting a plurality of clamp devices 803 in a secured position and a released position, respectively.

A cargo carrier including an automated self-loading cargo carrier for automobiles has been described. The foregoing description of the various exemplary embodiments of the invention has been presented for the purposes of illustration and disclosure. It is not intended to be exhaustive or to limit the invention to the precise form disclosed. Many modifications and variations are possible in light of the above teaching without departing from the spirit of the invention.

What is claimed is:

1. A cargo carrier, comprising:
   an enclosure including rear fittings configured to tiltably couple the enclosure to a rear portion of a vehicle roof rack;
   a pair of actuators housed inside the enclosure, each of the pair of actuators including an extension arm adapted to couple to a front portion of the vehicle roof rack;
   a deployable tray, slidably housed within the enclosure;
   one or more motors coupled to the deployable tray comprising a first motor coupled to the deployable tray and a second motor coupled to a conveyor mechanism installed on to the deployable tray; and
   a controller in communication with the pair of actuators and the one or more motors, the controller configured to:
   activate the pair of actuators to tilt the enclosure; and
   activate the one or more motors to slide the deployable tray outside of the enclosure.

2. The cargo carrier of claim 1, wherein the controller employs a receiver or transceiver for communicating with a remote control, the remote control configured to control activation of the cargo carrier.

3. The cargo carrier of claim 1, wherein the controller comprises a programmable memory configured to store one or more programmable enclosure positions.

4. The cargo carrier of claim 1, wherein the controller is adapted to draw power from a rechargeable battery housed within the enclosure.

5. The cargo carrier of claim 4, further comprising photovoltaic cells exposed on an exterior surface of the enclosure and coupled to the rechargeable battery.

6. The cargo carrier of claim 4, wherein the enclosure includes an access door for user-access to the rechargeable battery.

7. The cargo carrier of claim 1, wherein the enclosure is a single-piece molded enclosure.

8. The cargo carrier of claim 7, wherein the single-piece molded enclosure includes an interior frame configured to receive one or more clamp devices for securing items to the single-piece molded enclosure.

9. The cargo carrier of claim 7, wherein the deployable tray includes modular tray.

10. The cargo carrier of claim 1, further comprising an access door for user-access to a rechargeable battery, the access door including a remote-controlled locking mechanism.

11. A cargo carrier, comprising:
    an enclosure defined by a front wall, side walls, a top surface, a bottom surface and a rear access door opposite to the front wall of the enclosure, the enclosure further including rear fittings configured to tiltably couple the enclosure to a rear portion of a vehicle roof rack;
    one or more actuators, each of the one or more actuators coupled to one of the side walls of the enclosure and including an extension arm configured to couple with a front portion of the vehicle roof rack;
    a deployable tray, slidably housed within the enclosure; and
    a controller in communication with the one or more actuators and configured to:
    draw power from a rechargeable battery housed within the enclosure; and
    activate the one or more actuators so as to raise the front wall of the enclosure in order to tilt the enclosure, wherein the enclosure includes an interior frame configured to receive one or more clamp devices for securing items to the enclosure.

12. The cargo carrier of claim 11, wherein the controller employs a receiver or transceiver for communicating with a remote control, the remote control configured to control activation of the enclosure cargo carrier.

13. The cargo carrier of claim 11, wherein the controller comprises a programmable memory configured to store one or more programmable enclosure positions.

14. The cargo carrier of claim 11, further comprising photovoltaic cells exposed on an exterior surface of the enclosure and coupled to the rechargeable battery.

15. The cargo carrier of claim 11, wherein the enclosure includes an access door for user-access to the rechargeable battery.

16. The cargo carrier of claim 11, wherein the enclosure is a single-piece molded enclosure.

17. The cargo carrier of claim 11, further comprising one or more motors coupled to the deployable tray, wherein the controller is further configured to slide the deployable tray by actuating the one or more motors.

18. The cargo carrier of claim 17, wherein the one or more motors include:
    a first motor coupled to the deployable tray; and
    a second motor coupled to a conveyor mechanism installed on to the deployable tray.

19. The cargo carrier of claim 11, wherein the one or more clamp devices comprise external clamp devices adapted to secure items to an exterior of the enclosure.

20. A cargo carrier system, comprising:
    a cargo carrier adapted to couple to a vehicle roof rack, including:
    an enclosure adapted to tiltably couple to an aft end of the vehicle roof rack;
    one or more actuators, each of the one or more actuators coupled to a side wall of the enclosure and including an extension arm, the extension arm adapted to couple to a fore end of the vehicle roof rack;
    a deployable tray, slidably housed within the enclosure;
    a first motor coupled to the deployable tray;
    a second motor coupled to a conveyor mechanism installed on to the deployable tray; and
    a controller in communication with the one or more actuators, the first motor and the second motor, wherein the controller is configured to:
    draw power from a rechargeable battery housed within the enclosure;
    activate the one or more actuators so as to raise a front wall of the enclosure in order to tilt the enclosure; and activate the first motor to deploy the deployable tray outside of the enclosure; and
activate the second motor to move the conveyor mechanism installed on the deployable cover; and
a remote control configured to remotely control activation of the enclosure and the deployable tray.

\* \* \* \* \*